(12) United States Patent
Zhang et al.

(10) Patent No.: US 12,457,559 B2
(45) Date of Patent: Oct. 28, 2025

(54) POWER CONTROL METHOD AND APPARATUS

(71) Applicant: HUAWEI TECHNOLOGIES CO., LTD., Guangdong (CN)

(72) Inventors: Jian Zhang, Shenzhen (CN); Yifan Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 18/009,807

(22) PCT Filed: May 13, 2021

(86) PCT No.: PCT/CN2021/093700
§ 371 (c)(1),
(2) Date: Dec. 12, 2022

(87) PCT Pub. No.: WO2021/258905
PCT Pub. Date: Dec. 30, 2021

(65) Prior Publication Data
US 2023/0247560 A1    Aug. 3, 2023

(30) Foreign Application Priority Data

Jun. 22, 2020  (CN) .......................... 202010570506.1
Sep. 4, 2020   (CN) .......................... 202010923712.6

(51) Int. Cl.
*H04W 52/14* (2009.01)
*H04W 52/36* (2009.01)

(52) U.S. Cl.
CPC ....... *H04W 52/146* (2013.01); *H04W 52/365* (2013.01)

(58) Field of Classification Search
CPC . H04W 52/146; H04W 52/365; H04W 52/02; H04W 52/36; H04W 52/383; H04W 52/32; H04L 5/00
See application file for complete search history.

(56) References Cited

U.S. PATENT DOCUMENTS

2001/0004359 A1   6/2001  Nefedov
2013/0077571 A1   3/2013  Papasakellariou et al.
(Continued)

FOREIGN PATENT DOCUMENTS

CN   101447812 A   6/2009
CN   103975633 A   8/2014
(Continued)

OTHER PUBLICATIONS

R1-132334, NEC Group, Downlink Reference Signal Enhancement for Low Cost MTC, 3GPP TSG RAN WG1 Meeting #73, Fukuoka, Japan, May 20-24, 2013, 6 pages.
(Continued)

*Primary Examiner* — John J Lee

(57) ABSTRACT

The application discloses a method including: determining, by a terminal device, first indication information, wherein the first indication information is used to indicate one or more first transmit powers of the terminal device, and the first transmit power is a transmit power corresponding to a phase jump of an uplink signal of the terminal device; and sending, by the terminal device, the first indication information to a network device.

18 Claims, 9 Drawing Sheets

(56) References Cited

U.S. PATENT DOCUMENTS

| | | | |
|---|---|---|---|
| 2015/0085687 A1 | 3/2015 | Tabet et al. | |
| 2016/0064951 A1* | 3/2016 | Yamamoto | H02J 50/80 307/104 |
| 2016/0241086 A1* | 8/2016 | Jung | H02J 50/12 |
| 2019/0090201 A1 | 3/2019 | Akkarakaran et al. | |
| 2019/0373551 A1* | 12/2019 | Sundberg | H04W 52/0245 |
| 2021/0273497 A1* | 9/2021 | Wan | H02J 7/00034 |

FOREIGN PATENT DOCUMENTS

| | | |
|---|---|---|
| CN | 104039002 A | 9/2014 |
| CN | 102415005 B | 4/2015 |
| CN | 106686740 A | 5/2017 |
| CN | 108810960 A | 11/2018 |
| CN | 109803361 A | 5/2019 |
| CN | 109842926 A | 6/2019 |
| CN | 110167173 A | 8/2019 |
| CN | 110313199 A | 10/2019 |
| CN | 110351054 A | 10/2019 |
| CN | 110890950 A | 3/2020 |
| CN | 111096001 A | 5/2020 |
| EP | 2214362 A1 | 8/2010 |
| JP | 2016503591 A | 2/2016 |
| JP | 2019145866 A | 8/2019 |
| JP | 2019145886 A | 8/2019 |
| JP | 2019528650 A | 10/2019 |
| WO | 2004064248 A1 | 7/2004 |
| WO | 2015061955 A1 | 5/2015 |
| WO | 2018084793 A1 | 5/2018 |
| WO | 2019157897 A1 | 8/2019 |
| WO | 2020068314 A1 | 4/2020 |

OTHER PUBLICATIONS

R1-1701950, Guangdong Oppo Mobile Telecom, On NR PDCCH Structure and CCE-PRB mapping, 3GPP TSG RAN WG1 meeting #88, Athens, Greece Feb. 13-17, 2017, 7 pages.

3GPP TSG-RAN WG4 Meeting #74b R4-152012, "LS Out on Additional Aspects for MTC", RAN4, Rio de Janeiro, Brazil, Apr. 20-24, 2015, total 2 pages.

3GPP TSG RAN WG1 Meeting #93 R1-1807716, "Summary of SRS", Sony, Busan, Korea, May 21-25, 2018, total 60 pages.

* cited by examiner

POWER CONTROL METHOD AND APPARATUS

CROSS-REFERENCE TO RELATED APPLICATIONS

This application is a national stage of International Application No. PCT/CN2021/093700, filed on May 13, 2021, which claims priority to Chinese Patent Application No. 202010923712.6, filed on Sep. 4, 2020 and Chinese Patent Application No. 202010570506.1, filed on Jun. 22, 2020. All the aforementioned applications are hereby incorporated by reference in their entireties.

TECHNICAL FIELD

This application relates to the field of communication technologies, and in particular, to a power control method and an apparatus.

BACKGROUND

Because a transmit power of a terminal device is far lower than that of a base station, a signal to interference plus noise ratio (signal to interference plus Noise Ratio, SINR) of an uplink signal received by the base station from the terminal device is poor. When an uplink SINR value from the terminal device is less than a demodulation threshold of a network device, the base station cannot correctly demodulate uplink information sent by the terminal device.

To resolve this problem, the network device may perform channel estimation on an uplink channel of the terminal device based on an uplink reference signal sent by the terminal device in an uplink slot (slot), to restore a channel model of the uplink channel of the terminal device, eliminate interference on the channel, and improve signal quality of the uplink signal from the terminal device. Since an electromagnetic wave has a feature that a higher frequency indicates larger attenuation, in a communication system with a high frequency, the uplink signal sent by the terminal device has larger attenuation, with poorer uplink coverage.

SUMMARY

This application provides a power control method and an apparatus, to resolve a problem in the conventional technology that quality of an uplink signal of a terminal device is relatively poor.

To resolve the foregoing technical problem, the following technical solutions are used in this application:

According to a first aspect, a power control method is provided, including:

A terminal device determines first indication information. The first indication information is used to indicate one or more first transmit powers of the terminal device. The first transmit power is a transmit power corresponding to a phase jump of an uplink signal of the terminal device. The terminal device sends the first indication information to a network device.

Based on the foregoing technical solution, according to the power control method provided in embodiments of this application, the terminal device reports the first indication information to the network device, and the network device controls a transmit power of the terminal device based on the first indication information and whether the network device is performing joint channel estimation. This can avoid a case in which the transmit power of the terminal device reaches a power jump point when the network device performs joint channel estimation, and consequently the joint channel estimation performed by the network device is inaccurate.

In addition, the network device determines a joint channel estimation policy of the network device based on the first indication information and whether the network device is performing joint channel estimation. The network device does not perform joint channel estimation when the transmit power of the terminal device reaches the power jump point. This can avoid a joint channel estimation failure of the network device due to the phase jump of the uplink signal of the terminal device.

With reference to the first aspect, in a possible implementation, the first indication information includes one or more first values, and the one or more first values are in a one-to-one correspondence with the one or more first transmit powers. The first value is used to represent a difference between a first transmit power corresponding to the first value and a current transmit power. Based on this, the terminal device directly reports the difference between the first transmit power and the current transmit power to the network device, and the network device may directly determine, based on the difference, an adjusted power for the phase jump of the uplink signal of the terminal device, to provide a direct basis for the network device to generate transmit power control (transmit power control, TPC) or perform joint channel estimation.

With reference to the first aspect, in a possible implementation, the one or more first transmit powers correspond to a plurality of transmit power intervals, the first transmit power is an endpoint of one of the plurality of transmit power intervals, and the phase jump means that a phase of the uplink signal of the terminal device jumps when the transmit power of the terminal device is adjusted between different transmit intervals. Based on this, the first indication information indicates a transmit power interval of the terminal device when the phase jump occurs, and the network device may determine the transmit power interval based on the first transmit power in the first indication information. When controlling the transmit power of the terminal device, the network device controls the transmit power of the terminal device to be adjusted within a transmit power interval, to avoid the phase jump of the uplink signal of the terminal device.

With reference to the first aspect, in a possible implementation, the one or more first transmit powers include an endpoint of each of the plurality of transmit power intervals. In this way, the network device can determine an endpoint of each transmit power interval, to prevent the terminal device from reporting the first indication information for a plurality of times.

With reference to the first aspect, in a possible implementation, the current transmit power of the terminal device is a second transmit power, and the one or more first transmit powers include two first transmit powers that have a smallest difference from the second transmit power. In this way, bits occupied by the first indication information can be reduced, and signaling overheads can be reduced. In addition, the network device may determine endpoints of two closest transmit power intervals. The network device can adjust the transmit power of the terminal device upwards or downwards, to avoid that the transmit power of the terminal device is adjusted to the power jump point.

With reference to the first aspect, in a possible implementation, the current transmit power of the terminal device is a second transmit power, and the one or more first transmit powers include one first transmit power that has a smallest difference from the second transmit power. In this way, bits occupied by the first indication information can be further reduced, and signaling overheads can be reduced.

With reference to the first aspect, in a possible implementation, the current transmit power of the terminal device is a second transmit power, and the one or more first transmit powers include a first transmit power that is greater than the second transmit power and that has a smallest difference from the second transmit power. In this way, the terminal device may report the first transmit power when the transmit power of the terminal device is in an ascending trend, to avoid a mismatch between the first transmit power reported by the terminal device and a trend of the transmit power that is of the terminal device and that is adjusted by the network device.

With reference to the first aspect, in a possible implementation, the current transmit power of the terminal device is a second transmit power, and the one or more first transmit powers include a first transmit power that is less than the second transmit power and that has a smallest difference from the second transmit power. In this way, the terminal device may report the first transmit power when the transmit power of the terminal device is in a descending trend, to avoid a mismatch between the first transmit power reported by the terminal device and a trend of the transmit power that is of the terminal device and that is adjusted by the network device.

With reference to the first aspect, in a possible implementation, the terminal device determines whether an absolute value of a smallest difference between the current transmit power and the endpoint of each of the plurality of transmit power intervals is less than or equal to a first threshold. If the absolute value of the smallest difference between the current transmit power and the endpoint of each of the plurality of transmit power intervals is less than or equal to the first threshold, the terminal device sends the first indication information to the network device. In this way, the terminal device reports the first indication information when the transmit power approaches a closest first transmit power, so that a quantity of pieces of first indication information reported by the terminal device can be reduced, and signaling overheads of the terminal device can be further reduced.

With reference to the first aspect, in a possible implementation, the terminal device receives second indication information from the network device. The second indication information is used to indicate the terminal device to send the first indication information. The second indication information is carried in any one of the following: a radio resource control (radio resource control, RRC) message, a media access control-control element (Media Access Control-control element, MAC CE), or downlink control information (downlink control information, DCI). The terminal device sends the first indication information to the network device in response to the second indication information. The first indication information is carried in a MAC CE sent by the terminal device. The MAC CE carrying the first indication information is any one of the following: a MAC CE carrying a power headroom report PHR, a newly added MAC CE, or a MAC CE sent in an uplink slot scheduled by DCI including transmit power control (transmit power control, TPC). In this way, the terminal device reports the first indication information based on the indication of the network device, so that a quantity of pieces of first indication information reported by the terminal device can be reduced, and signaling overheads of the terminal device can be further reduced.

With reference to the first aspect, in a possible implementation, the second indication information is used to indicate the terminal device to periodically report the first indication information. Alternatively, the second indication information is used to indicate the terminal device to send the first indication information to the network device when the absolute value of the smallest difference between the current transmit power and the endpoint of each of the plurality of transmit power intervals is less than or equal to the first threshold. Alternatively, the second indication information is used to indicate the terminal device to report the first indication information at a preset time point. In this way, the terminal device may report the first indication information in different manners, to increase applicable scenarios of the method.

With reference to the first aspect, in a possible implementation, the second indication information is further used to indicate a reporting manner of the first indication information and a quantity of first transmit powers in the first indication information. In this way, the network device may determine the first transmit power in the first indication information based on the second indication information.

According to a second aspect, a power control method is provided, including:

A network device receives first indication information from a terminal device. The first indication information is used to indicate one or more first transmit powers of the terminal device, and the first transmit power is a transmit power corresponding to a phase jump of an uplink signal of the terminal device.

With reference to the second aspect, in a possible implementation, the first indication information includes one or more first values, and the one or more first values are in a one-to-one correspondence with the one or more first transmit powers. The first value is used to represent a difference between a first transmit power corresponding to the first value and a current transmit power.

With reference to the second aspect, in a possible implementation, the one or more first transmit powers correspond to a plurality of transmit power intervals, the first transmit power is an endpoint of one of the plurality of transmit power intervals, and the phase jump means that a phase of the uplink signal of the terminal device jumps when the transmit power of the terminal device is adjusted between different transmit intervals.

With reference to the second aspect, in a possible implementation, if the network device is performing joint channel estimation, the network device indicates the terminal device to adjust the transmit power of the terminal device in a first power interval. The first power interval is a transmit power interval that is in the plurality of transmit power intervals and that includes the current transmit power of the terminal device.

With reference to the second aspect, in a possible implementation, the network device determines a first slot. The transmit power of the terminal device in the first slot is adjusted beyond a first power interval, and the first power interval is a transmit power interval that is in the plurality of transmit power intervals and that includes the current transmit power of the terminal device. The network device does not perform joint channel estimation in the first slot with a slot before the first slot.

With reference to the second aspect, in a possible implementation, the one or more first transmit powers include an endpoint of each of the plurality of transmit power intervals.

With reference to the second aspect, in a possible implementation, the current transmit power of the terminal device is a second transmit power, and the one or more first transmit powers include two first transmit powers that have a smallest difference from the second transmit power.

With reference to the second aspect, in a possible implementation, the current transmit power of the terminal device is a second transmit power, and the one or more first transmit powers include one first transmit power that has a smallest difference from the second transmit power.

With reference to the second aspect, in a possible implementation, the current transmit power of the terminal device is a second transmit power, and the one or more first transmit powers include a first transmit power that is greater than the second transmit power and that has a smallest difference from the second transmit power.

With reference to the second aspect, in a possible implementation, the current transmit power of the terminal device is a second transmit power, and the one or more first transmit powers include a first transmit power that is less than the second transmit power and that has a smallest difference from the second transmit power.

With reference to the second aspect, in a possible implementation, the network device sends second indication information to the terminal device. The second indication information is used to indicate the terminal device to send the first indication information. The first indication information is carried in a MAC CE sent by the terminal device, and the second indication information is carried in any one of the following: an RRC message, a MAC CE, or DCI.

With reference to the second aspect, in a possible implementation, the second indication information is used to indicate the terminal device to periodically report the first indication information. Alternatively, the second indication information is used to indicate the terminal device to send the first indication information to the network device when an absolute value of a smallest difference between the current transmit power and the endpoint of each of the plurality of transmit power intervals is less than or equal to a first threshold. Alternatively, the second indication information is used to indicate the terminal device to report the first indication information at a preset time point.

With reference to the second aspect, in a possible implementation, the second indication information is further used to indicate a correspondence between the one or more first transmit powers in the first indication information and N first transmit powers.

According to a third aspect, a power control method is provided, including:

A terminal device determines a first time window. The first time window is a time period in which a network device performs joint channel estimation.

The terminal device adjusts a transmit power of the terminal device in a first power interval in the first time window. The first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

Based on the foregoing technical solution, when the network device performs joint channel estimation, the terminal device controls a phase of the uplink signal of the terminal device not to jump. This resolves a problem that joint channel estimation performed by the network device is inaccurate due to the phase jump of the uplink signal of the terminal device.

With reference to the third aspect, in a possible implementation, the terminal device receives third indication information from the network device. The third indication information is used to indicate a maximum quantity L of consecutive slots included in the first time window, a quantity of slots required by the network device to perform one joint channel estimation is greater than or equal to 1 and less than or equal to L, and L is a positive integer greater than or equal to 1. The terminal device determines the first time window based on the third indication information. In this way, the terminal device may determine duration of the first time window based on the third indication information.

With reference to the third aspect, in a possible implementation, a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot; the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot. In this way, the terminal device determines a start condition of the first time window, and the terminal device determines the first time window based on the start condition and the duration of the first time window.

With reference to the third aspect, in a possible implementation, the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots. In this way, the network device performs joint channel estimation in the $H^{th}$ slot to the $(H+Q)^{th}$ slot, and the terminal device may determine the $H^{th}$ slot to the $(H+Q)^{th}$ slot as the first time window.

With reference to the third aspect, in a possible implementation, the terminal device adjusts, in a first slot after the first time window, the transmit power of the terminal device based on TPC sent by the network device. In this way, after the first time window, the terminal device immediately adjusts the transmit power of the terminal device based on the TPC sent by the network device. This can ensure that the transmit power of the terminal device matches a transmission requirement.

With reference to the third aspect, in a possible implementation, the terminal device determines a first difference. The first difference is an absolute value of a difference between the current transmit power of the terminal device and a third transmit power of the terminal device. The third transmit power is a transmit power obtained after the network device indicates the terminal device to adjust the transmit power. When the first difference is less than or equal to a first threshold, the terminal device adjusts the transmit power of the terminal device in the first power interval. In this way, when a difference between the current transmit power of the terminal device and the transmit power of the terminal device that needs to be adjusted by the network device is relatively small, a difference between the current transmit power of the terminal device and a power required for uplink transmission is relatively small, and the terminal device may adjust the transmit power of the terminal device in the first power interval, to avoid the phase jump of the uplink signal of the terminal device.

With reference to the third aspect, in a possible implementation, the terminal device determines the first difference. When the first difference is greater than the first threshold, the terminal device adjusts the transmit power of the terminal device to the third transmit power. In this way, when the difference between the current transmit power of the terminal device and the transmit power of the terminal device that needs to be adjusted by the network device is relatively large, if the terminal device does not adjust the transmit power based on the indication of the network device, an uplink failure may be caused. In this case, the terminal device adjusts the transmit power based on the indication of the network device, so that the uplink failure can be avoided.

With reference to the third aspect, in a possible implementation, the terminal device receives fourth indication information from the network device. The fourth indication information is used to indicate the network device to enable joint channel estimation. In this way, the terminal device performs the foregoing solution when the network device enables joint channel estimation, so that a joint channel estimation failure of the network device can be avoided.

With reference to the third aspect, in a possible implementation, the terminal device determines whether a second difference is less than or equal to a second threshold. The second difference is an absolute value of a difference between the current transmit power of the terminal device and a first transmit power. If the second difference is less than or equal to the second threshold, the terminal device sends fifth indication information to the network device. The fifth indication information is used to indicate that the second difference is less than the second threshold. In this way, the terminal device reports the case when the transmit power approaches a power jump point, so that the network device does not perform joint channel estimation in a subsequent period of time, to avoid a joint channel estimation failure.

According to a fourth aspect, a power control method is provided, including:

A network device sends third indication information to a terminal device. The third indication information is used to indicate a maximum quantity L of consecutive slots included in a first time window, the first time window is a time period in which the network device performs joint channel estimation, a quantity of slots required by the network device to perform one joint channel estimation is greater than or equal to 1 and less than or equal to L, and L is a positive integer greater than or equal to 1.

With reference to the fourth aspect, in a possible implementation, a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot; the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

With reference to the fourth aspect, in a possible implementation, the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

With reference to the fourth aspect, in a possible implementation, the method further includes: The network device sends fourth indication information to the terminal device. The fourth indication information is used to indicate the network device to enable joint channel estimation.

With reference to the fourth aspect, in a possible implementation, the network device receives fifth indication information from the terminal device. The fifth indication information is used to indicate that a second difference is less than a second threshold, and the second difference is an absolute value of a difference between a current transmit power of the terminal device and a first transmit power.

According to a fifth aspect, a communication apparatus is provided, including a processing unit and a communication unit.

The processing unit is configured to determine first indication information. The first indication information is used to indicate one or more first transmit powers of a terminal device, and the first transmit power is a transmit power corresponding to a phase jump of an uplink signal of the terminal device.

The communication unit is configured to send the first indication information to a network device.

With reference to the fifth aspect, in a possible implementation, the first indication information includes one or more first values, and the one or more first values are in a one-to-one correspondence with the one or more first transmit powers. The first value is used to represent a difference between a first transmit power corresponding to the first value and a current transmit power.

With reference to the fifth aspect, in a possible implementation, the one or more first transmit powers correspond to a plurality of transmit power intervals, the first transmit power is an endpoint of one of the plurality of transmit power intervals, and the phase jump means that a phase of the uplink signal of the terminal device jumps when the transmit power of the terminal device is adjusted between different transmit intervals.

With reference to the fifth aspect, in a possible implementation, the one or more first transmit powers include an endpoint of each of the plurality of transmit power intervals.

With reference to the fifth aspect, in a possible implementation, the current transmit power of the terminal device is a second transmit power, and the one or more first transmit powers include two first transmit powers that have a smallest difference from the second transmit power.

With reference to the fifth aspect, in a possible implementation, the current transmit power of the terminal device is a second transmit power, and the one or more first transmit powers include one first transmit power that has a smallest difference from the second transmit power.

With reference to the fifth aspect, in a possible implementation, the current transmit power of the terminal device is a second transmit power, and the one or more first transmit powers include a first transmit power that is greater than the second transmit power and that has a smallest difference from the second transmit power.

With reference to the fifth aspect, in a possible implementation, the current transmit power of the terminal device is a second transmit power, and the one or more first transmit powers include a first transmit power that is less than the second transmit power and that has a smallest difference from the second transmit power.

With reference to the fifth aspect, in a possible implementation, the processing unit is further configured to determine whether an absolute value of a smallest difference between the current transmit power and the endpoint of each of the plurality of transmit power intervals is less than or equal to a first threshold. The processing unit is further configured to indicate the communication unit to send the first indication information to the network device.

With reference to the fifth aspect, in a possible implementation, the communication unit is further configured to receive second indication information from the network device. The second indication information is used to indicate the terminal device to send the first indication information. The second indication information is carried in any one of the following: an RRC message, a MAC CE, or DCI. The processing unit is further configured to indicate the communication unit to send the first indication information to the network device. The first indication information is carried in a MAC CE sent by the terminal device, and the MAC CE carrying the first indication information is any one of the following: a MAC CE carrying a power headroom report PHR, a newly added MAC CE, or a MAC CE sent in an uplink slot scheduled by DCI including TPC.

With reference to the fifth aspect, in a possible implementation, the second indication information is used to indicate the terminal device to periodically report the first indication information. Alternatively, the second indication information is used to indicate the terminal device to send the first indication information to the network device when the absolute value of the smallest difference between the current transmit power and the endpoint of each of the plurality of transmit power intervals is less than or equal to the first threshold. Alternatively, the second indication information is used to indicate the terminal device to report the first indication information at a preset time point.

With reference to the fifth aspect, in a possible implementation, the second indication information is further used to indicate a reporting manner of the first indication information and a quantity of first transmit powers in the first indication information.

According to a sixth aspect, a communication apparatus is provided, including a processing unit and a communication unit.

The processing unit is configured to indicate the communication unit to receive first indication information from a terminal device. The first indication information is used to indicate one or more first transmit powers of the terminal device. The first transmit power is a transmit power corresponding to a phase jump of an uplink signal of the terminal device.

With reference to the sixth aspect, in a possible implementation, the first indication information includes one or more first values, and the one or more first values are in a one-to-one correspondence with the one or more first transmit powers. The first value is used to represent a difference between a first transmit power corresponding to the first value and a current transmit power.

With reference to the sixth aspect, in a possible implementation, the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

With reference to the sixth aspect, in a possible implementation, the processing unit is further configured to: if a network device is performing joint channel estimation, indicate the terminal device to adjust the transmit power of the terminal device in a first power interval. The first power interval is a transmit power interval that is in the plurality of transmit power intervals and that includes the current transmit power of the terminal device.

With reference to the sixth aspect, in a possible implementation, a first slot is determined. The transmit power of the terminal device in the first slot is adjusted beyond a first power interval, and the first power interval is a transmit power interval that is in the plurality of transmit power intervals and that includes the current transmit power of the terminal device. Joint channel estimation is not performed in the first slot with a slot before the first slot.

With reference to the sixth aspect, in a possible implementation, the one or more first transmit powers include an endpoint of each of the plurality of transmit power intervals.

With reference to the sixth aspect, in a possible implementation, the current transmit power of the terminal device is a second transmit power, and the one or more first transmit powers include two first transmit powers that have a smallest difference from the second transmit power.

With reference to the sixth aspect, in a possible implementation, the current transmit power of the terminal device is a second transmit power, and the one or more first transmit powers include one first transmit power that has a smallest difference from the second transmit power.

With reference to the sixth aspect, in a possible implementation, the current transmit power of the terminal device is a second transmit power, and the one or more first transmit powers include a first transmit power that is greater than the second transmit power and that has a smallest difference from the second transmit power.

With reference to the sixth aspect, in a possible implementation, the current transmit power of the terminal device is a second transmit power, and the one or more first transmit powers include a first transmit power that is less than the second transmit power and that has a smallest difference from the second transmit power.

With reference to the sixth aspect, in a possible implementation, the communication unit is further configured to send second indication information to the terminal device. The second indication information is used to indicate the terminal device to send the first indication information. The first indication information is carried in a MAC CE sent by the terminal device.

With reference to the sixth aspect, in a possible implementation, the second indication information is used to indicate the terminal device to periodically report the first indication information. Alternatively, the second indication information is used to indicate the terminal device to send the first indication information to the network device when an absolute value of a smallest difference between the current transmit power and the endpoint of each of the plurality of transmit power intervals is less than or equal to a first threshold. Alternatively, the second indication information is used to indicate the terminal device to report the first indication information at a preset time point.

With reference to the sixth aspect, in a possible implementation, the second indication information is further used to indicate a correspondence between the one or more first transmit powers in the first indication information and N first transmit powers.

According to a seventh aspect, a communication apparatus is provided, including a processing unit. The processing unit is configured to determine a first time window. The first time window is a time period in which a network device performs joint channel estimation.

The processing unit is further configured to adjust a transmit power of the terminal device in a first power interval in the first time window. The first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

With reference to the seventh aspect, in a possible implementation, the communication apparatus further includes a communication unit. The communication unit is configured to receive third indication information from the network device. The third indication information is used to indicate a maximum quantity L of consecutive slots included in the first time window, a quantity of slots required by the network device to perform one joint channel estimation is greater than or equal to 1 and less than or equal to L, and L is a positive integer greater than or equal to 1. The processing unit is further configured to determine the first time window based on the third indication information.

With reference to the seventh aspect, in a possible implementation, a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot; the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

With reference to the seventh aspect, in a possible implementation, the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

With reference to the seventh aspect, in a possible implementation, the processing unit is further configured to adjust, in a first slot after the first time window, the transmit power of the terminal device based on TPC sent by the network device.

With reference to the seventh aspect, in a possible implementation, the processing unit is specifically configured to determine a first difference. The first difference is an absolute value of a difference between the current transmit power of the terminal device and a third transmit power of the terminal device. The third transmit power is a transmit power obtained after the network device indicates the terminal device to adjust the transmit power. When the first difference is less than or equal to a first threshold, the transmit power of the terminal device is adjusted in the first power interval.

With reference to the seventh aspect, in a possible implementation, the processing unit is further configured to determine the first difference. When the first difference is greater than the first threshold, the transmit power of the terminal device is adjusted to the third transmit power.

With reference to the seventh aspect, in a possible implementation, the communication unit is further configured to receive fourth indication information from the network device. The fourth indication information is used to indicate the network device to enable joint channel estimation.

With reference to the seventh aspect, in a possible implementation, the processing unit is further configured to determine whether a second difference is less than or equal to a second threshold. The second difference is an absolute value of a difference between the current transmit power of the terminal device and a first transmit power. The processing unit is further configured to indicate the communication unit to send fifth indication information to the network device. The fifth indication information is used to indicate that the second difference is less than the second threshold.

According to an eighth aspect, a communication apparatus is provided, including a processing unit and a communication unit. The processing unit is configured to indicate the communication unit to send third indication information to a terminal device. The third indication information is used to indicate a maximum quantity L of consecutive slots included in a first time window, the first time window is a time period in which a network device performs joint channel estimation, a quantity of slots required by the network device to perform one joint channel estimation is greater than or equal to 1 and less than or equal to L, and L is a positive integer greater than or equal to 1.

With reference to the eighth aspect, in a possible implementation, a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot; the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

With reference to the eighth aspect, in a possible implementation, the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

With reference to the eighth aspect, in a possible implementation, the communication unit is further configured to send fourth indication information to the terminal device. The fourth indication information is used to indicate the network device to enable joint channel estimation.

With reference to the eighth aspect, in a possible implementation, the communication unit is further configured to receive fifth indication information from the terminal device. The fifth indication information is used to indicate that a second difference is less than a second threshold, and the second difference is an absolute value of a difference between a current transmit power of the terminal device and a first transmit power.

According to a ninth aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the first aspect or the possible implementations of the first aspect. The communication apparatus may be a terminal device, or may be a chip in a terminal device.

According to a tenth aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the second aspect or the possible implementations of the second aspect. The communication apparatus may be a network device, or may be a chip in a network device.

According to an eleventh aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the third aspect or the possible implementations of the third aspect. The communication apparatus may be a terminal device, or may be a chip in a terminal device.

According to a twelfth aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the fourth aspect or the possible implementations of the fourth aspect. The communication apparatus may be a network device, or may be a chip in a network device.

According to a thirteenth aspect, this application provides a communication system, including a first communication apparatus and a second communication apparatus. The first communication apparatus is configured to perform the method described in any one of the first aspect or the possible implementations of the first aspect. The second communication apparatus is configured to perform the method according to any one of the second aspect or the possible implementations of the second aspect.

According to a fourteenth aspect, this application provides a communication system, including a third communication apparatus and a fourth communication apparatus. The third communication apparatus is configured to perform the method according to any one of the third aspect or the possible implementations of the third aspect. The fourth communication apparatus is configured to perform the method according to any one of the fourth aspect or the possible implementations of the fourth aspect.

According to a fifteenth aspect, this application provides a computer-readable storage medium. The computer-readable storage medium stores instructions, and when the instructions are run on a computer, the computer is enabled to perform the method according to any one of the first aspect or the possible implementations of the first aspect.

According to a sixteenth aspect, this application provides a computer-readable storage medium. The computer-readable storage medium stores instructions, and when the instructions are run on a computer, the computer is enabled to perform the method according to any one of the second aspect or the possible implementations of the second aspect.

According to a seventeenth aspect, this application provides a computer-readable storage medium. The computer-readable storage medium stores instructions, and when the instructions are run on a computer, the computer is enabled to perform the method according to any one of the third aspect or the possible implementations of the third aspect.

According to an eighteenth aspect, this application provides a computer-readable storage medium. The computer-readable storage medium stores instructions, and when the instructions are run on a computer, the computer is enabled to perform the method according to any one of the fourth aspect or the possible implementations of the fourth aspect.

According to a nineteenth aspect, this application provides a computer program product including instructions. When the computer program product runs on a computer, the computer is enabled to perform the method according to any one of the first aspect or the possible implementations of the first aspect.

According to a twentieth aspect, this application provides a computer program product including instructions. When the computer program product runs on a computer, the computer is enabled to perform the method according to any one of the second aspect or the possible implementations of the second aspect.

According to a twenty-first aspect, this application provides a computer program product including instructions. When the computer program product runs on a computer, the computer is enabled to perform the method according to any one of the third aspect or the possible implementations of the third aspect.

According to a twenty-second aspect, this application provides a computer program product including instructions. When the computer program product runs on a computer, the computer is enabled to perform the method according to any one of the fourth aspect or the possible implementations of the fourth aspect.

It should be understood that, descriptions of technical features, technical solutions, beneficial effects, or similar words in this application do not imply that all features and advantages can be implemented in any individual embodiment. On the contrary, it may be understood that, the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

DESCRIPTION OF EMBODIMENTS

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

Figure 1:
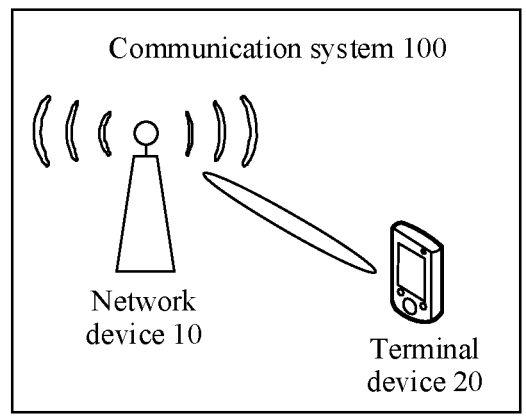
FIG. 1 is a diagram of a system architecture of a communication system according to an embodiment of this application.

A power control method provided in embodiments of this application is applied to a communication system 100 shown in FIG. 1. As shown in FIG. 1, the communication system 100 includes a network device 10 and a terminal device 20. The terminal device 20 is configured to send uplink data to the network device 10. The network device 10 is configured to: receive the uplink data from the terminal device 20, and perform power control on a transmit power of the terminal device 20.

A communication system in embodiments of this application includes but is not limited to a long term evolution (long term evolution, LTE) system, a 5th-generation (5th-generation, 5G) system, a new radio (new radio, NR) system, a wireless local area network (wireless local area network, WLAN) system, a future evolved system, or a system converging a plurality of communication technologies. For example, a method provided in embodiments of this application may be specifically applied to an evolved-universal terrestrial radio access network (evolved-universal terrestrial radio access network, E-UTRAN) system and a next generation-radio access network (next generation-radio access network, NG-RAN) system.

A network device in embodiments of this application is a network-side entity configured to send a signal, receive a signal, or send a signal and receive a signal. The network device may be an apparatus that is deployed in a radio access network (radio access network, RAN) and that provides a wireless communication function for a terminal device, for example, may be a TRP, a base station (for example, an evolved NodeB (evolved NodeB, eNB or eNodeB), a next generation node base station (next generation node base station, gNB), or a next generation eNB (next generation eNB, ng-eNB)), various forms of control nodes (for example, a network controller, a radio controller (such as a radio controller in a cloud radio access network (cloud radio access network, CRAN) scenario)), or a road side unit (road side unit, RSU). Specifically, the network device may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminal devices that fall within coverage of the plurality of base stations. In systems using different radio access technologies (radio access technologies, RATs), names of devices having a base station function may be different. For example, the base station may be referred to as an eNB or an eNodeB in an LTE system, and may be referred to as a gNB in a 5G system or an NR system. A specific name of the base station is not limited in this application. The network device may alternatively be a network device in a future evolved public land mobile network (public land mobile network, PLMN) or the like.

A terminal device in embodiments of this application is a user-side entity configured to receive a signal, send a signal, or receive a signal and send a signal. The terminal device is configured to provide one or more of a voice service and a data connectivity service for a user. The terminal device may also be referred to as user equipment (user equipment, UE), a terminal, an access terminal, a subscriber unit, a subscriber station, a mobile station, a remote station, a remote terminal, a mobile device, a user terminal, a wireless communication device, a user agent, or a user apparatus. The terminal device may be a vehicle-to-everything (vehicle-to-everything, V2X) device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in HEV, PHEV), or a new energy vehicle (new energy vehicle). Alternatively, the terminal device may be a device-to-device (device-to-device, D2D) device, for example, an electricity meter or a water meter. Alternatively, the terminal device may be a mobile station (mobile station, MS), a subscriber unit (subscriber unit), an uncrewed aerial vehicle, an internet of things (internet of things, IoT) device, a station (station, ST) in a WLAN, a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which may also be referred to as a wearable intelligent device). The terminal device may alternatively be a terminal device in a next-generation communication system, for example, a terminal device in a 5G system, a terminal device in a future evolved PLMN, or a terminal device in an NR system.

To make this application clearer, some concepts in this application are first briefly described.

1. Power Headroom Report (Power Headroom Report, PHR)

Power headroom (Power Headroom, PH) represents a difference between a maximum transmit power allowed by a terminal device and a transmit power of the terminal indicated by a network device.

The transmit power of the terminal indicated by the network device is determined based on a transmission rate of uplink transmission required by the network device. For example, a method for indicating, by the network device, a transmit power for transmitting a PUSCH by the terminal is as follows: The network device determines, based on a required transmission rate of the PUSCH, the transmit power for transmitting the PUSCH by the terminal device.

In the PH, there is a case in which the transmit power of the terminal indicated by the network device is greater than the maximum transmit power allowed by the terminal device. In other words, there is a case in which a value of the PH is a negative value.

Specifically, when the maximum transmit power allowed by the terminal device is greater than the transmit power of the terminal indicated by the network device, the value of the PH is a positive value. In this case, the terminal device still has power headroom that can be allocated. When allocating transmission resources to the terminal device, the network device may continue to increase a quantity of transmission resources allocated to the terminal device.

When the maximum transmit power allowed by the terminal device is less than the transmit power of the terminal indicated by the network device, the value of the PH is a negative value. In this case, the transmit power required by the uplink transmission rate scheduled by the network device for the terminal device has exceeded the maximum transmit power allowed by the terminal device. When the network device subsequently allocates transmission resources to the terminal device, the network device needs to reduce a quantity of transmission resources allocated to the terminal device.

2. Power Adjustment

Currently, when the terminal device sends uplink data, the terminal device may send the uplink data at one of a plurality of different transmit powers. The terminal device adjusts a transmit power of the terminal device in a current slot based on TPC sent by the network device to the terminal device and a path loss (Path loss) measured by the terminal device.

In a continuous uplink transmission process, the terminal device may adjust the transmit power of the terminal device based on a correspondence shown in the Table 1.

As shown in Table 1, the first column in Table 1 is a TPC command field (TPC Command Field) delivered by the network device to the terminal device, including four values "0", "1", "2", "3".

The second column in Table 1 is an accumulated power correction value. The terminal device adjusts a transmit power ($\delta_{PUSCH,b,f,c}$) of a PUSCH or adjusts a transmit power ($\delta_{SRS,b,f,c}$) of an SRS based on the TPC command field delivered by the network device. When the value of the TPC command field is 0, the transmit power of the terminal device is reduced by 1 dB. When the value of the TPC command field is 1, the transmit power of the terminal device remains unchanged. When the value of the TPC command field is 2, the transmit power of the terminal device is increased by 1 dB. When the value of the TPC command field is 3, the transmit power of the terminal device is increased by 3 dB.

The third column in Table 1 is an absolute power correction value. The absolute power correction value is similar to the accumulated power correction value. A difference lies in that: The accumulated power correction value is to gradually adjust the transmit power of the terminal device to a target transmit power in an accumulative manner based on previous power adjustment, but the absolute power correction value is to directly adjust the transmit power of the terminal device to the target transmit power.

TABLE 1

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

3. Power Jump Point

The power jump point is also referred to as a power gear switching point, and is a transmit power that is in a plurality of transmit powers of the terminal device and that causes a phase jump of an uplink signal of the terminal device.

The jump means that a phase jump occurs in an uplink signal of the terminal device. The gear switching means that a supply voltage of a PA of the terminal device is switched from one gear to another gear.

Whether a phase of the uplink signal of the terminal device jumps is related to the supply voltage of the PA of the terminal device. When the supply voltage of the PA of the terminal device changes, the phase of the uplink signal of the terminal device jumps. When the supply voltage of the PA of the terminal device does not change, the phase of the uplink signal of the terminal device does not jump.

The supply voltage of the PA of the terminal device is related to the transmit power of the terminal device. The terminal device corresponds to a plurality of supply voltages of the PA, and the plurality of supply voltages are in a one-to-one correspondence with a plurality of transmit power intervals corresponding to the terminal device. When the transmit power of the terminal device is adjusted within a transmit power interval, the supply voltage of the PA of the terminal device does not change. When the transmit power of the terminal device is adjusted from one transmit power interval to another transmit power interval, the supply voltage of the PA of the terminal device changes. To be specific, the supply voltage of the PA of the terminal device is also adjusted from a supply voltage corresponding to one transmit power interval to a supply voltage corresponding to another transmit power interval.

After the transmit power of the terminal device is adjusted from another transmit power to the power jump point, the supply voltage of the PA of the terminal device may be switched. As a result, the phase jump may occur in the uplink signal of the terminal device.

4. Channel Estimation

Channel estimation is a method in which the network device determines a channel matrix of an uplink channel of the terminal device in a slot based on an uplink reference signal sent by the terminal device in the slot, and restores a channel model of the uplink channel of the terminal device based on the channel matrix of the uplink channel, to eliminate interference on the uplink channel of the terminal device and improve an SINR sent by the terminal device.

The foregoing briefly describes some concepts in this application.

To resolve a problem that quality of the uplink signal of the terminal device cannot be further improved by using a current channel estimation method, embodiments of this application provide a multi-slot joint channel estimation (joint channel estimation for short below) method. The network device performs joint estimation based on a channel estimation result in each of a plurality of scheduled consecutive uplink slots, to determine an SINR of an uplink signal sent by a device.

The network device estimates an uplink channel in a plurality of slots by using joint channel estimation, so that a better channel estimation result can be obtained.

However, in the multi-slot joint channel estimation, it is required that phases of uplink signals transmitted by the terminal in the slots of the joint channel estimation need to be continuous, and no jump occurs. However, in the current terminal device, the terminal device adjusts the transmit power of the terminal device based on the TPC sent by the network device to the terminal device and the path loss measured by the terminal device. When the transmit power of the terminal reaches the power jump point, the terminal device adjusts the supply voltage of the power amplifier, causing the phase jump of the uplink signal. Consequently, joint channel estimation performed by the network device is inaccurate.

Based on the foregoing problem that joint channel estimation performed by the network device is inaccurate because the power of the terminal device reaches the power jump point and the phase jump occurs in the uplink signal of the terminal device, embodiments of this application provide a power control method. The terminal device reports one or more first transmit powers of the terminal device to the network device. When the transmit power of the terminal device reaches the first transmit power, the phase jump occurs in the uplink signal of the terminal device. The network device determines the transmit power corresponding to the terminal device when determining, based on the one or more first transmit powers, that the phase jump occurs in the uplink signal of the terminal device, and performs power control on the terminal device based on the first transmit power, or controls joint channel estimation of the network device based on the first transmit power.

Based on the foregoing technical solution, according to the power control method provided in embodiments of this application, the terminal device reports first indication information to the network device, and the network device controls the transmit power of the terminal device based on the first indication information and whether the network device is performing joint channel estimation. This can avoid a case in which the transmit power of the terminal device jumps when the network device performs joint channel estimation, and consequently the joint channel estimation performed by the network device is inaccurate.

Embodiment 1

Figure 2:
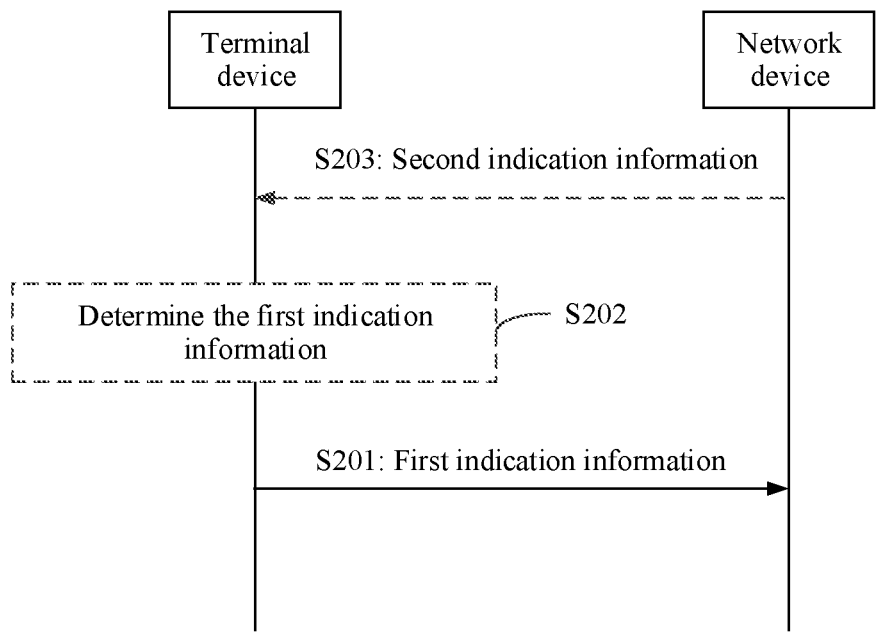
FIG. 2 is a schematic flowchart of a power control method according to an embodiment of this application.

As shown in FIG. 2, a power control method provided in an embodiment of this application includes the following steps.

S201: A terminal device sends first indication information to a network device. Correspondingly, the network device receives the first indication information from the terminal device.

The first indication information is used to indicate one or more first transmit powers of the terminal device, and the first transmit power is a transmit power corresponding to a phase jump of an uplink signal of the terminal device (that is, a power jump point corresponding to the terminal device).

In a possible implementation, the one or more first transmit powers in the first indication information correspond to a plurality of transmit power intervals, and the first transmit power is an endpoint of one of the plurality of transmit power intervals. The phase jump means that when a transmit power of the terminal device is adjusted between different transmit intervals, a phase of the uplink signal of the terminal device jumps.

In this way, the terminal device may indirectly indicate one or more transmit power intervals of the terminal device by using the first indication information. Therefore, the network device can perform power control or joint channel estimation on the terminal device based on the transmit power interval.

In a specific implementation, the first indication information includes one or more first values, and the one or more first values are in a one-to-one correspondence with the one or more first transmit powers. In this way, the first indication information may specifically indicate the one or more first transmit powers in a form of the first value.

Based on the foregoing technical solution, according to the power control method provided in this embodiment of this application, the terminal device indicates the first transmit power of the terminal device by reporting the first indication information to the network device, that is, indicates, to the network device, the power jump point at which the phase jump occurs on the terminal device. In this way, the network device may perform joint channel estimation or perform power control on the terminal device based on the first indication information, to avoid that the phase of the uplink signal of the terminal device jumps when the network device performs joint channel estimation, thereby resolving a problem that joint channel estimation performed by the network device is inaccurate.

It should be noted that, in this embodiment of this application, after the network device receives the first indication information from the terminal device, the network device may determine the power jump point of the terminal device based on the first indication information. In this way, when performing joint channel estimation, the network device may control the transmit power of the terminal device not to reach the power jump point, to ensure that the phase of the uplink signal of the terminal device does not jump. Alternatively, the network device may not perform joint channel estimation when the transmit power of the terminal device reaches the power jump point. This resolves a problem that joint channel estimation performed by the network device is inaccurate because the phase of the uplink signal of the terminal device jumps.

It may be understood that, after the network device receives the first indication information, whether the network device performs joint channel estimation or performs power control on the terminal device based on the first indication information is not limited in this embodiment of this application.

In a possible implementation of this embodiment of this application, as shown in FIG. 2, before S201, the power control method provided in this embodiment of this application further includes the following steps.

S202: The terminal device determines the first indication information.

It should be noted that the first indication information may be generated by the terminal device based on a current transmit power of the terminal device and each transmit power interval of the terminal device. Alternatively, the first indication information may be prestored in the terminal device, or the terminal device may determine the first indication information in another manner. This is not limited in this application.

For example, when the first indication information is generated by the terminal device based on the current transmit power of the terminal device and each transmit power interval of the terminal device, the terminal device may generate the first indication information based on any case recorded in S201.

When the first indication information is prestored in the terminal device, the terminal device may prestore the first indication information corresponding to each case recorded in S201, and separately set a corresponding trigger condition. When the trigger condition is met, the terminal device sends the corresponding first indication information to the network device.

In a possible implementation of S201, in a scenario in which the first indication information includes one or more first values, the first value includes the following two cases: Case A: The first value is a difference between the first transmit power and the current transmit power. Case B: The first value is an actual value of the first transmit power.

The following separately describes the case A and the case B in detail with reference to Example 1.

Example 1 is as follows: The terminal device has 20 transmit powers, which are respectively 0 to 19. The 20 transmit powers are divided into four power intervals, and the four power intervals respectively correspond to four supply voltages of the terminal device. A relationship between the transmit power, the transmit power interval, and the supply voltage of the terminal device is shown in Table 2.

TABLE 2

| Supply voltage | Transmit power interval | Transmit power |
|---|---|---|
| First supply voltage | First interval | 0, 1, 2, 3, 4, 5 |
| Second supply voltage | Second interval | 6, 7, 8, 9, 10, 11 |
| Third supply voltage | Third interval | 12, 13, 14, 15, 16, 17 |
| Fourth supply voltage | Fourth interval | 18, 19 |

Case A: The first value is a difference between the first transmit power and the current transmit power.

In Case A, with reference to Example 1, the current transmit power of the terminal device is 10. In this case, a correspondence between the first value and the transmit power interval is shown in Table 3.

TABLE 3

| Transmit power interval | First value |
|---|---|
| First interval | −10, −5 |
| Second interval | −4, 1 |
| Third interval | 2, 7 |
| Fourth interval | 8, 9 |

It should be noted that the first indication information in this application may include all first values in Table 3, or include some first values in Table 3. Descriptions are provided below based on different cases.

The current transmit power of the terminal device is a transmit power of the terminal device in a current slot before the terminal device receives TPC delivered by the network device.

Case A1: The first value is a difference between a left endpoint and a right endpoint of each transmit power interval and the current transmit power of the terminal device.

In this case, the first value included in the first indication information is all first values shown in Table 3.

Case A2: The first value is a difference between a left endpoint of each transmit power interval and the current transmit power of the terminal device.

In this case, the first value included in the first indication information is shown in Table 4.

TABLE 4

| Transmit power interval | First value |
|---|---|
| First interval | −10 |
| Second interval | −4 |
| Third interval | 2 |
| Fourth interval | 8 |

Case A3: The first value is a difference between a right endpoint of each transmit power interval and the current transmit power of the terminal device.

In this case, the first value included in the first indication information is shown in Table 5.

TABLE 5

| Transmit power interval | First value |
|---|---|
| First interval | −5 |
| Second interval | 1 |
| Third interval | 7 |
| Fourth interval | 9 |

Case A4: The first value is a difference between a left endpoint and a right endpoint of a transmit power interval to which the current transmit power of the terminal device belongs and the current transmit power of the terminal device.

In this case, if the transmit power interval to which the current transmit power of the terminal device belongs is the second interval, the first value included in the first indication information is shown in Table 6.

TABLE 6

| Transmit power interval | First value |
|---|---|
| Second interval | −4, 1 |

Case A5: The first value is a difference between a first endpoint and the current transmit power of the terminal device.

The first endpoint is an endpoint that has a smallest difference from the current transmit power of the terminal device in the transmit power interval to which the current transmit power of the terminal device belongs.

In this case, if the transmit power interval to which the current transmit power of the terminal device belongs is the second interval, and an endpoint that is in the second interval and that has a smallest difference from the current transmit power of the terminal device is a right endpoint 11, the first value included in the first indication information is shown in Table 7.

TABLE 7

| Transmit power interval | First value |
|---|---|
| Second interval | 1 |

Case A6: If the network device indicates the terminal device to increase the transmit power for all the latest M times before the terminal device determines the first indication information, the first value is a difference between the right endpoint of the transmit power interval to which the current transmit power belongs and the current transmit power of the terminal device. M is a positive integer.

In this case, if the transmit power interval to which the current transmit power of the terminal device belongs is the second interval, the first value included in the first indication information is shown in Table 8.

TABLE 8

| Transmit power interval | First value |
|---|---|
| Second interval | 1 |

Case A7: If the network device indicates the terminal device to reduce the transmit power for all the latest M times before the terminal device determines the first indication information, the first value is a difference between the left endpoint of the transmit power interval to which the current transmit power belongs and the current transmit power of the terminal device.

In this case, if the transmit power interval to which the current transmit power of the terminal device belongs is the second interval, the first value included in the first indication information is shown in Table 9.

TABLE 9

| Transmit power interval | First value |
|---|---|
| Second interval | −4 |

Case A8: The first value is a difference between a second endpoint and the current transmit power of the terminal device.

The second endpoint is an endpoint that is in a power interval adjacent to the transmit power interval to which the current transmit power of the terminal device belongs and that is adjacent to the transmit power interval to which the current transmit power belongs. There are one or more second endpoints.

In this case, if the transmit power interval to which the current transmit power of the terminal device belongs is the second interval, the second endpoint includes an endpoint 5 that is in the first interval and that is adjacent to the second interval (that is, a right endpoint of the first interval), and an endpoint 12 that is in the third interval and that is adjacent to the second interval (that is, a left endpoint of the third interval).

In this case, the first value included in the first indication information is shown in Table 10.

TABLE 10

| Transmit power interval | First value |
|---|---|
| First interval | −5 |
| Third interval | 2 |

Case A9: The first value is a difference between a third endpoint and the current transmit power of the terminal device.

The third endpoint is a second endpoint that is of the one or more second endpoints and that has a smallest absolute value of a difference between the second endpoint and the current transmit power of the terminal device.

For example, with reference to Case A8, the second endpoint includes the endpoint 5 that is in the first interval and that is adjacent to the second interval (that is, the right endpoint of the first interval), and the endpoint 12 that is in the third interval and that is adjacent to the second interval (that is, the left endpoint of the third interval). A second endpoint that is of the two second endpoints and that has a smallest absolute value of a difference between the second endpoint and the current transmit power (10) of the terminal device is the left endpoint 12 of the third interval. Therefore, the third endpoint is the left endpoint 12 of the third interval.

In this case, the first value included in the first indication information is shown in Table 11.

TABLE 11

| Transmit power interval | First value |
|---|---|
| Third interval | 2 |

Case A10: If the network device indicates the terminal device to increase the transmit power for all the latest M times before the terminal device determines the first indication information, the first value is a difference between a fourth endpoint and the current transmit power of the terminal device.

The fourth endpoint is a left endpoint of a right-side neighboring interval of the interval to which the current transmit power of the terminal device belongs.

If the transmit power interval to which the current transmit power of the terminal device belongs is the second interval, the fourth endpoint is the left endpoint 12 of the third interval.

In this case, the first value included in the first indication information is shown in Table 12.

TABLE 12

| Transmit power interval | First value |
|---|---|
| Third interval | 2 |

Case A11: If the network device indicates the terminal device to reduce the transmit power for all the latest M times before the terminal device determines the first indication information, the first value is a difference between a fifth endpoint and the current transmit power of the terminal device.

The fifth endpoint is a right endpoint of a left-side neighboring interval of the interval to which the current transmit power of the terminal device belongs.

If the transmit power interval to which the current transmit power of the terminal device belongs is the second interval, the fifth endpoint is the right endpoint 5 of the first interval.

In this case, the first value included in the first indication information is shown in Table 13.

TABLE 13

| Transmit power interval | First value |
|---|---|
| First interval | −5 |

It should be noted that, in the tables shown in Case A1 to Case A11, for ease of understanding, transmit power intervals corresponding to the first values included in the first indication information are listed. The first indication information actually reported by the terminal device may include only the first value but not the transmit power interval corresponding to the first value, to reduce signaling overheads of the terminal device.

The foregoing are detailed descriptions of Case A. In case A, the terminal device directly indicates the difference between the first transmit power and the current transmit power. The terminal device can indicate, based on the first value, a power adjustment interval within which the phase of the uplink signal of the terminal device does not jump.

When performing joint channel estimation, the network device may control a power adjustment value in the TPC sent to the terminal device to fall within the power adjustment interval. In this way, when the network device performs joint channel estimation, the phase of the uplink signal of the terminal device does not jump.

Alternatively, the network device may not perform joint channel estimation when the power adjustment value in the TPC sent to the terminal device exceeds the power adjustment interval. In this way, when the phase of the uplink signal of the terminal device jumps, the network device does not perform joint channel estimation. This resolves a problem that joint channel estimation performed by the network device is inaccurate because the phase of the uplink signal of the terminal device jumps.

Case B: The first value is an actual value of the first transmit power.

When the first value is used to represent the actual value of the first transmit power, for example, the first transmit power is a left endpoint of each transmit power interval, the first value includes the following several cases.

Case B1: The first value is a value of a left endpoint of each transmit power interval.

In this case, the first value included in the first indication information is shown in Table 14.

TABLE 14

| Transmit power interval | First value |
| --- | --- |
| First interval | 0 |
| Second interval | 6 |
| Third interval | 12 |
| Fourth interval | 18 |

Case B2: The first values are values that are of two left endpoints in left endpoints of all transmit power intervals and that are with a smallest difference from the current transmit power of the terminal device.

In other words, the terminal device corresponds to N first transmit powers, and the one or more first transmit powers in the first indication information are two transmit powers that are of the N first transmit powers and that have a smallest difference from the current transmit power of the terminal device.

In this case, the first value included in the first indication information is shown in Table 15.

TABLE 15

| Transmit power interval | First value |
| --- | --- |
| Second interval | 6 |
| Third interval | 12 |

Case B3: The first value is a value that is of a left endpoint in left endpoints of all transmit power intervals and that is with a smallest difference from the current transmit power of the terminal device.

It should be noted that, if the first transmit power that has the smallest difference from the current transmit power includes two transmit powers, the terminal device may send either of the two first transmit powers to the network device, or the terminal device sends, to the network device, one of the two first transmit powers that meets a condition.

In this case, the first value included in the first indication information is shown in Table 16.

TABLE 16

| Transmit power interval | First value |
| --- | --- |
| Second interval | 6 |

Case B4: The first value is a value that is of a left endpoint in left endpoints of all transmit power intervals and that is greater than the current transmit power of the terminal device and with a smallest difference from the current transmit power of the terminal device.

It should be noted that, if the network device indicates the terminal device to increase the transmit power for all the latest M times before the terminal device determines the first indication information, the terminal device determines the first indication information based on the first value recorded in Case B4, and reports the first indication information to the network device.

In this case, the first value included in the first indication information is shown in Table 17.

TABLE 17

| Transmit power interval | First value |
| --- | --- |
| Third interval | 12 |

Case B5: The first value is a value that is of a left endpoint in left endpoints of all transmit power intervals and that is less than the current transmit power of the terminal device and with a smallest difference from the current transmit power of the terminal device.

It should be noted that, if the network device indicates the terminal device to reduce the transmit power for all the latest M times before the terminal device determines the first indication information, the terminal determines the first indication information based on the first value recorded in Case B4, and reports the first indication information to the network device.

In this case, the first value included in the first indication information is shown in Table 18.

TABLE 18

| Transmit power interval | First value |
| --- | --- |
| Second interval | 6 |

It should be noted that, an example in which the first value in the first indication information sent by the terminal device to the network device is the left endpoint of the transmit power interval is used to describe various cases of the value of the first transmit power in Case B.

In actual application, the plurality of first transmit powers sent by the terminal device to the network device may include both the left endpoint of the transmit power interval and a right endpoint of the transmit power interval. For example, with reference to Example 1, the first value in the first indication information sent by the terminal device to the network device is shown in Table 19.

TABLE 19

| Transmit power interval | First value |
|---|---|
| First interval | 0, 5 |
| Second interval | 6, 11 |
| Third interval | 12, 17 |
| Fourth interval | 18, 19 |

Alternatively, the plurality of first transmit powers sent by the terminal device to the network device may include the right endpoint of the transmit power interval. For example, with reference to Example 1, the first value in the first indication information sent by the terminal device to the network device is shown in Table 20.

TABLE 20

| Transmit power interval | First value |
|---|---|
| First interval | 5 |
| Second interval | 11 |
| Third interval | 17 |
| Fourth interval | 19 |

The plurality of first transmit powers sent by the terminal device to the network device may include both the left endpoint of the transmit power interval and the right endpoint of the transmit power interval. An implementation process in which the plurality of first transmit powers sent by the terminal device to the network device may include the right endpoint of the transmit power interval is similar to the foregoing process in which the plurality of first transmit powers sent by the terminal device to the network device include the left endpoint of the transmit power interval. Details are not described in this application.

It should be noted that when the terminal device reports only one endpoint of each of the plurality of intervals to the network device, the terminal device and the network device may determine, according to a protocol stipulation, to report a left endpoint or a right endpoint of each interval.

Alternatively, the terminal device determines, based on an indication of the network device, to report a left endpoint or a right endpoint of each interval.

Alternatively, after the terminal device determines to report the left endpoint of each interval to the network device or report the right endpoint of each interval to the network device, the terminal device sends indication information to the network device, to indicate whether the left endpoint or the right endpoint of each transmit power interval is reported this time.

For example, the terminal device adds a 1-bit indicator bit to the first indication information, and the indicator bit is used to indicate whether the first transmit power in the first indication information reported this time is the left endpoint or the right endpoint of the power interval.

More specifically, when the value of the bit is 0, it indicates that the first transmit power in the first indication information is the left endpoint of the terminal device; or when the value of the bit is 1, it indicates that the first transmit power in the first indication information is the right endpoint of the terminal device.

It should be noted that transmit powers of the terminal device are continuous. Therefore, when the first transmit power sent by the terminal device to the network device is the left endpoint of each power interval, the network device may determine the right endpoint of each power interval based on the left endpoint of each power interval.

For example, when the network device determines that left endpoints of intervals reported by the terminal device are respectively: a left endpoint of the first interval is 0, a left endpoint of the second interval is 6, a left endpoint of the third interval is 13, and a left endpoint of the fourth interval is 18, the network device determines that a right endpoint of the first interval is 1 less than the left endpoint of the second interval. In this way, the network device determines that the right endpoint of the first interval is 5. In the same way, the network device may determine that a right endpoint of the second interval is 12, and a right endpoint of the third interval is 17. The network device determines that a right endpoint of the fourth interval is a maximum power 19 corresponding to the terminal device.

With reference to Case A, Case B, and Example 1, the foregoing describes a form in which the first indication information indicates the first transmit power.

When the terminal device sends the first indication information to the network device, the first indication information may be carried in a MAC CE sent by the terminal device.

When the first indication information is carried in a MAC CE, the MAC CE may be a MAC CE carrying a PHR.

Alternatively, the MAC CE is a newly defined MAC CE.

Alternatively, the MAC CE is a MAC CE sent in an uplink slot scheduled by DCI that is delivered by the network device and that includes TPC, and the TPC is a power command reference power sent by the network device to the terminal device.

The first indication information and the first value in the first indication information is described by using an example in S201. It should be noted that the foregoing is merely an example for description, and the first indication information may alternatively indicate the first transmit power in another manner. This is not limited in this application.

In a possible implementation of this embodiment of this application, after the network device receives the first indication information from the terminal device, operations performed by the network device based on the first indication information include the following two scenarios: Scenario 1 and Scenario 2. The following separately describes Scenario 1 and Scenario 2 in detail.

Scenario 1: If the network device is performing joint channel estimation, the network device indicates the terminal device to adjust the transmit power of the terminal device in a first power interval.

The first power interval is a transmit power interval that is in the plurality of transmit power intervals and that includes the current transmit power of the terminal device.

Figure 3A:
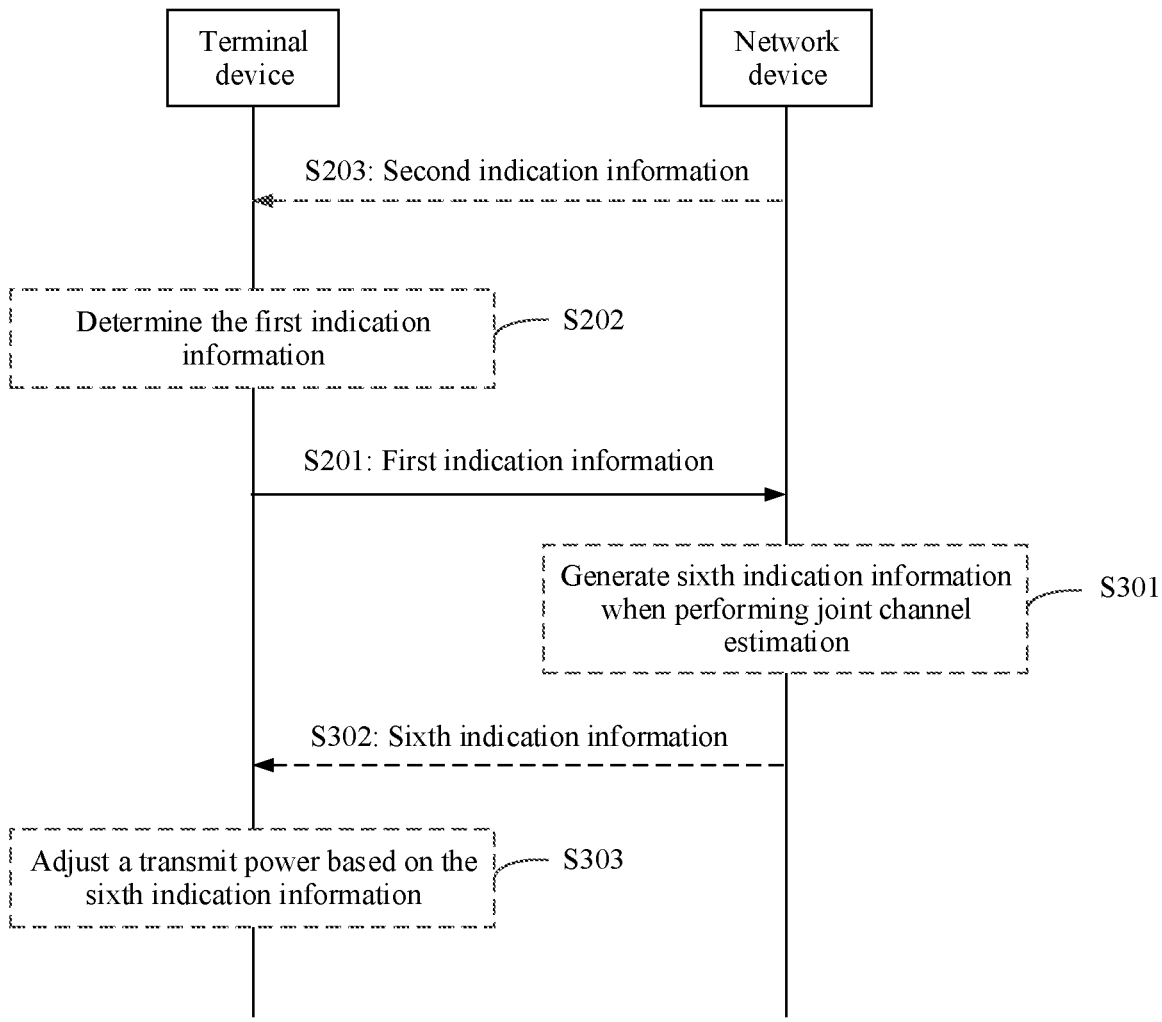
FIG. 3a is a schematic flowchart of another power control method according to an embodiment of this application.

In a possible implementation, with reference to FIG. 2, as shown in FIG. 3a, in Scenario 1, the network device is specifically configured to perform the following S301 to S303.

S301: The network device generates sixth indication information when performing joint channel estimation.

The sixth indication information is used to indicate the terminal device to adjust the transmit power of the terminal device in the first power interval.

S302: The network device sends the sixth indication information to the terminal device. Accordingly, the terminal device receives the sixth indication information from the network device.

S303: The terminal device adjusts the transmit power of the terminal device based on the sixth indication information.

In a possible implementation, the sixth indication information is TPC generated by the network device. When the network device needs to send the TPC to the terminal device, the network device generates first TPC based on information such as channel quality of a current uplink transmission channel of the terminal device. The first TPC includes a power adjustment value of the terminal device.

The network device determines, based on the first indication information reported by the terminal device, whether the transmit power of the uplink signal sent by the terminal device jumps after the terminal adjusts the transmit power based on the power adjustment value indicated by the first TPC.

If the transmit power of the uplink signal sent by the terminal device jumps, the network device adjusts the power adjustment value in the first TPC to generate second TPC. The network device sends the second TPC to the terminal device. Correspondingly, the terminal device receives the second TPC from the network device.

When the terminal device adjusts the transmit power of the terminal device based on a power adjustment value in the second TPC, the transmit power of the uplink signal sent by the terminal device does not jump.

If the transmit power of the uplink signal sent by the terminal device does not jump, the network device directly sends the first TPC to the terminal device.

In other words, the network device controls that no phase jump occurs on the terminal device in a process in which the network device performs joint channel estimation. After the network device finishes the joint channel estimation, the network device performs normal power control on the terminal device.

In an example, with reference to Case A8 in Case A, and Example 1, the first value indicated by the first indication information is shown in Table 10. According to Table 10, a power adjustment interval that is determined by the network device and in which no phase jump occurs in the uplink signal of the terminal device is shown in Table 21.

TABLE 21

| Power adjustment interval | (−5, +2) |
| --- | --- |

In other words, the terminal device indicates, to the network device by using the first indication information, that when the transmit power of the terminal device decreases by 5 or the transmit power of the terminal device increases by 2, the phase of the uplink signal of the terminal device jumps. Correspondingly, the network device may determine, based on the indication of the first indication information, that when the transmit power of the terminal device decreases by 5 or the transmit power of the terminal device increases by 2, the phase of the uplink signal of the terminal device jumps.

In this case, the power adjustment value in the first TPC generated by the network device is +3. The network device determines that the power adjustment value +3 is beyond the power adjustment interval (−5, +2) indicated by the first indication information, and further determines that the transmit power of the uplink signal sent by the terminal device jumps after the terminal device adjusts the transmit power based on the first TPC.

In this case, the network device generates the second TPC based on the first TPC, and the power adjustment value in the second TPC is adjusted to +1. The network device determines that the power adjustment value +1 is within the power adjustment interval (−5, +2) indicated by the first indication information. After the terminal device adjusts the transmit power based on the power adjustment value, the transmit power of the uplink signal sent by the terminal device does not jump. The network device sends the second TPC to the terminal device.

In another example, with reference to Case A and Example 1, the power adjustment interval in which the network device determines that no phase jump occurs in the uplink signal of the terminal device is shown in Table 21. The power adjustment value in the first TPC generated by the network device is +1.

The network device determines that the power adjustment value+1 is within the power adjustment interval (−5, +2) indicated by the first indication information. After the terminal device adjusts the transmit power based on the power adjustment value, the transmit power of the uplink signal sent by the terminal device does not jump. The network device sends the first TPC to the terminal device.

In still another example, with reference to Case B1 and Example 1, the first value indicated by the first indication information is shown in Table 14. According to Table 14, an adjusted power interval that is determined by the network device and in which no phase jump occurs in the uplink signal of the terminal device is shown in Table 22.

TABLE 22

| Adjusted power interval | (6, 11) |
| --- | --- |

In other words, the terminal device indicates, to the network device by using the first indication information, that when the transmit power of the terminal device is lower than 6 or the transmit power of the terminal device is higher than 11, the phase of the uplink signal of the terminal device jumps. Correspondingly, the network device may determine, based on the indication of the first indication information, that when the transmit power of the terminal device is lower than 6 or the transmit power of the terminal device is higher than 11, the phase of the uplink signal of the terminal device jumps. The network device determines that the transmit power adjusted by the terminal device based on the first TPC is 13, and the transmit power 13 is higher than 11. In this case, the transmit power of the uplink signal sent by the terminal device jumps.

In this case, the network device generates the second TPC based on the first TPC, and the power adjustment value in the second TPC is adjusted to +1. The network device determines that the transmit power adjusted by the terminal device based on the second TPC is 11. In this case, the transmit power of the uplink signal sent by the terminal device does not jump. The network device sends the second TPC to the terminal device.

In yet another example, with reference to Case B and Example 1, an adjusted power interval in which the network device determines that no phase jump occurs in the uplink signal of the terminal device is shown in Table 22.

The power adjustment value in the first TPC generated by the network device is +1.

The network device determines that the transmit power adjusted by the terminal device based on the first TPC is 11. In this case, the transmit power of the uplink signal sent by the terminal device does not jump. The network device sends the first TPC to the terminal device.

Scenario 2: The network device does not perform joint channel estimation when the power of the terminal device reaches the first transmit power.

Figure 3B:
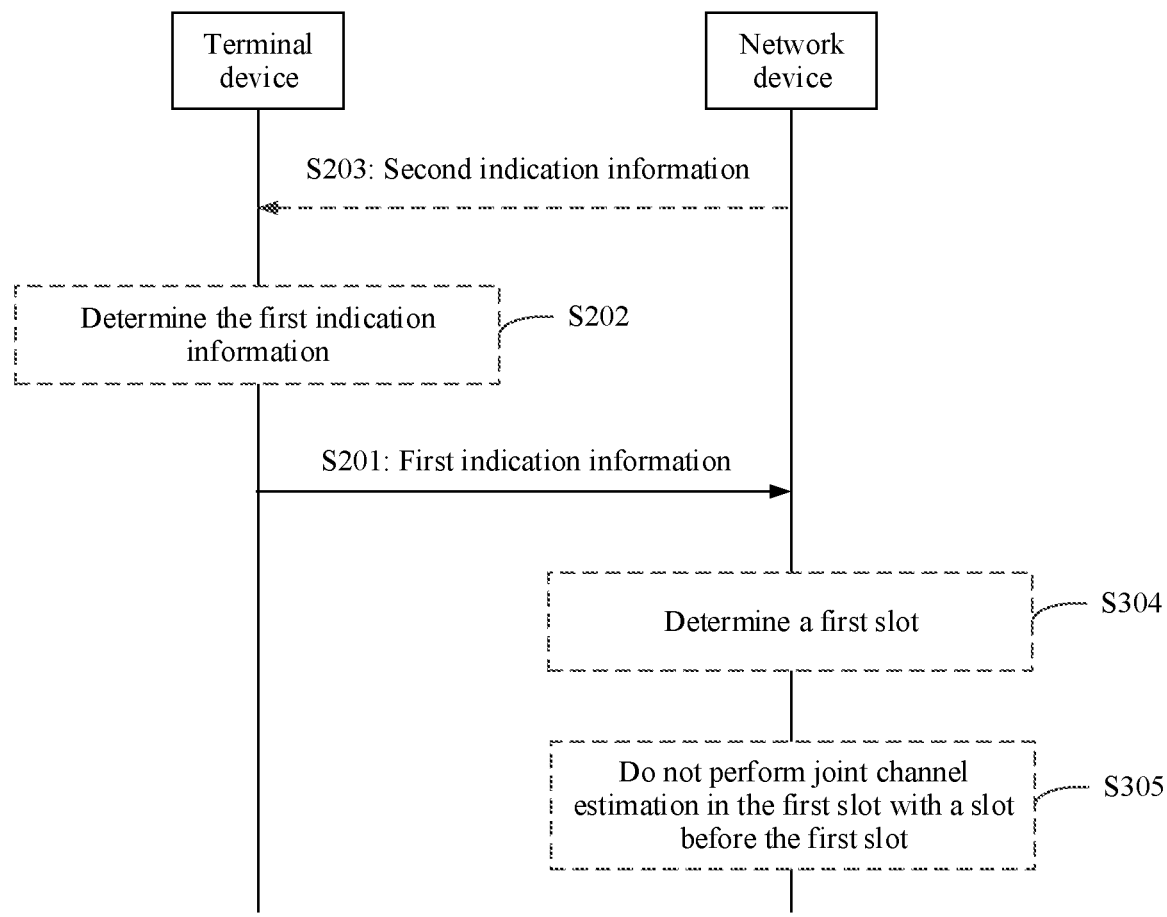
FIG. 3b is a schematic flowchart of still another power control method according to an embodiment of this application.

In a possible implementation, with reference to FIG. 2, as shown in FIG. 3b, in Scenario 2, the network device is configured to perform the following S304 and S305.

S304: The network device determines a first slot.

The transmit power of the terminal device in the first slot is adjusted beyond a first power interval, and the first power interval is a transmit power interval that is in the plurality of transmit power intervals and that includes the current transmit power of the terminal device.

The first slot is a slot in which the transmit power of the terminal device is adjusted beyond the first power interval.

Specifically, the first slot is a slot in which the terminal device performs power adjustment based on the TPC. After the terminal device adjusts the transmit power based on the TPC, the phase jump occurs in the uplink signal of the terminal device.

S305: The network device does not perform joint channel estimation in the first slot with a slot before the first slot.

The network device does not perform, in a slot at a first time point, joint channel estimation with a slot before the slot. In the slot and a slot after the slot, if the terminal device is still transmitting uplink data, the network device may normally perform joint channel estimation in the slot and the slot after the slot.

For example, a power jump point corresponding to the terminal device is 6, and the network device determines that the current transmit power of the terminal device is 5. The network device determines that transmission quality of a current transmission link is relatively poor, and the terminal device needs to adjust the transmit power to 8 in a seventh uplink transmission slot. In this case, the network device determines that the phase jump of the uplink signal of the terminal device occurs in the seventh slot.

In this case, the network device determines not to perform joint channel estimation in the seventh slot with the previous first slot to sixth slot. If the terminal device transmits uplink data in subsequent slots such as an eighth slot and a ninth slot, and the transmit power of the terminal device does not reach the power jump point, the terminal device may perform joint channel estimation in the seventh slot, the eighth slot, and the ninth slot.

Based on the foregoing technical solution, after the network device receives the first indication information, the network device may adjust the transmit power within a preset transmit power interval in a process in which the network device indicates the terminal device to adjust the transmit power when the network device performs joint channel estimation, to avoid the phase jump of the uplink signal of the terminal device; or avoid that the network device does not perform joint channel estimation when the phase jump occurs in the uplink signal of the terminal device. This avoids a case in which joint channel estimation performed by the network device is inaccurate.

In a possible implementation, with reference to FIG. 2, before S202, the method further includes:

S203: The network device sends second indication information to the terminal device. Accordingly, the terminal device receives the second indication information from the network device.

The second indication information is used to indicate the terminal device to send the first indication information. Optionally, the second indication information is further used to indicate a correspondence between the one or more first transmit powers in the first indication information and the N first transmit powers. For example, the second indication information indicates that the first value in the first indication information reported by the terminal device is one first value in any one of Case A1 to Case A11, or the first transmit power corresponding to the first value is one first transmit power in any one of Case B1 to Case B5.

The second indication information is carried in any one of the following: an RRC message, a MAC CE, or DCI.

The second indication information is used to indicate the terminal device to periodically report the first indication information.

Alternatively, the second indication information is used to indicate the terminal device to send the first indication information to the network device when an absolute value of a smallest difference between the current transmit power and the endpoint of each of the plurality of transmit power intervals is less than or equal to a first threshold.

Alternatively, the second indication information is used to indicate the terminal device to report the first indication information at a preset time point.

In response to the second indication information, the terminal device performs S201.

In a possible implementation, when the second indication information is used to indicate the terminal device to send the first indication information to the network device when an absolute value of a difference between the current transmit power and the endpoint of each of the plurality of transmit power intervals is less than or equal to the first threshold, before the terminal device sends the first indication information to the network device, the method further includes:

The terminal device determines whether the absolute value of the smallest difference between the current transmit power and the endpoint of each of the plurality of transmit power intervals is less than or equal to the first threshold.

If the absolute value of the smallest difference between the current transmit power and the endpoint of each of the plurality of transmit power intervals is less than or equal to the first threshold, the terminal device sends the first indication information to the network device.

If the absolute value of the smallest difference between the current transmit power and the endpoint of each of the plurality of transmit power intervals is greater than the first threshold, the terminal device does not send the first indication information to the network device.

It should be noted that when the terminal device determines that the absolute value of the smallest difference between the current transmit power and the endpoint of each of the plurality of transmit power intervals is less than or equal to the first threshold, the transmit power of the terminal device is likely to be adjusted from one power adjustment interval to another power adjustment interval. In this case, the terminal device needs to report the first indication information to the network device, so that the network device determines that the phase of the uplink signal may jump in a process in which the terminal device subsequently sends the uplink data.

Embodiment 2

Based on the foregoing problem that joint channel estimation performed by the network device is inaccurate because the power of the terminal device reaches the power jump point and the phase jump occurs in the uplink signal of the terminal device, an embodiment of this application provides a power control method. A network device indicates, to a terminal device, a first time window in which the network device performs joint channel estimation. The terminal device adjusts, in the first time window, a transmit power of the terminal device in a power interval in which a phase of an uplink signal does not jump.

Based on the foregoing technical solution, when the network device performs joint channel estimation, the terminal device controls the phase of the uplink signal of the terminal device not to jump. This resolves a problem that joint channel estimation performed by the network device is inaccurate due to the phase jump of the uplink signal of the terminal device.

Figure 4:
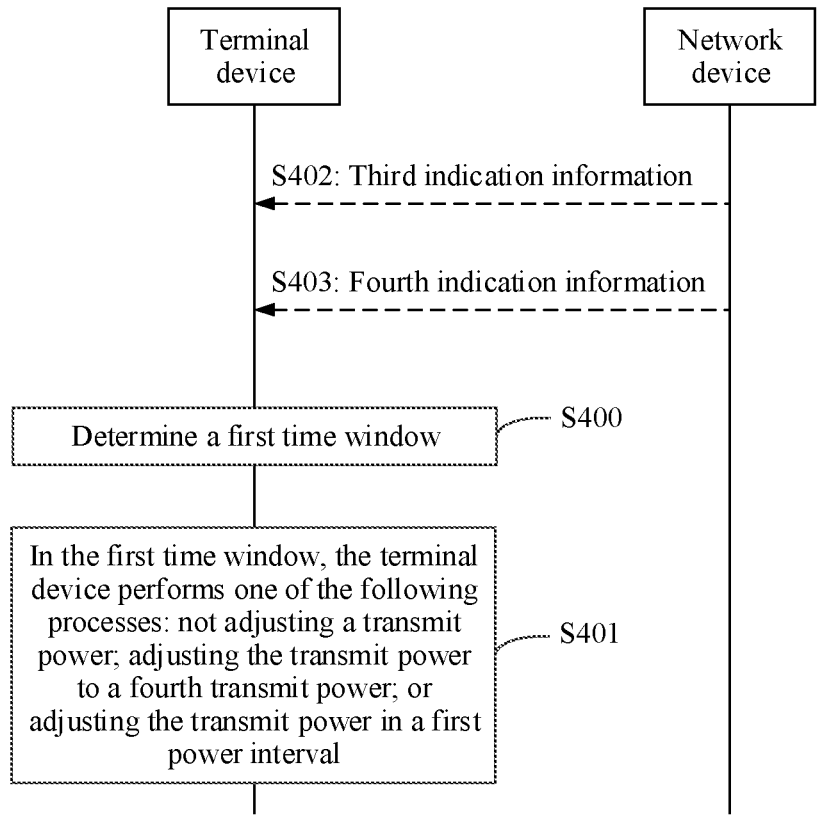
FIG. 4 is a schematic flowchart of yet another power control method according to an embodiment of this application.

As shown in FIG. 4, a power adjustment method provided in an embodiment of this application further includes the following steps.

S400: The terminal device determines the first time window.

The first time window is a time period in which the network device performs joint channel estimation.

In a possible implementation, the terminal device may determine a maximum window length of the first time window based on third indication information delivered by the network device to the terminal device. Alternatively, the terminal device may determine the maximum window length of the first time window according to a protocol stipulation. Alternatively, the terminal device may determine the maximum window length of the first time window based on preconfiguration information. This is not limited in this application.

When the network device indicates the maximum window length of the first time window to the terminal device by using the third indication information, the network device may indicate the maximum window length of the first time window in a plurality of manners.

In an example, the first time window includes a plurality of uplink slots, and the network device indicates, by using the third indication information, a maximum quantity L of consecutive slots included in the first time window. In other words, the third indication information indicates the maximum window length of the first time window by indicating the maximum quantity of consecutive slots included in the first time window. A quantity of slots required by the network device to perform one joint channel estimation is greater than or equal to 1 and less than or equal to L, and L is a positive integer greater than or equal to 1.

In another example, the network device indicates, by using the third indication information, the maximum window length of the first time window is A milliseconds (ms). A is greater than 0. Duration required by the network device to perform one joint channel estimation is greater than or equal to 0 ms and less than or equal to A ms.

The third indication information may be carried in RRC sent by the network device to the terminal device, or the third indication information may be carried in a MAC CE sent by the network device. This is not limited in this application.

The following provides detailed description by using an example in which the first time window includes a plurality of uplink slots, and the network device indicates, by using the third indication information, a maximum quantity L of consecutive slots included in the first time window.

In this case, the first time window in which the network device performs joint channel estimation is a time period in which the terminal device sends the uplink data in a plurality of consecutive slots.

For example, the network device needs to perform joint channel estimation in three consecutive slots. In other words, a time length of the first time window is a time length of three slots.

When the terminal device sends the uplink data in three consecutive slots, the network device performs joint channel estimation once in the three consecutive slots.

When the terminal device sends the uplink data in six consecutive slots, the network device performs joint channel estimation twice in the six consecutive slots. In other words, the network device performs joint channel estimation once in the first three slots of the six consecutive slots, and performs joint channel estimation once in the last three slots of the six consecutive slots.

When the terminal device sends the uplink data in five consecutive slots, the network device performs joint channel estimation twice in the five consecutive slots. In other words, the network device performs joint channel estimation once in the first three slots of the five consecutive slots, and performs joint channel estimation once in the last two slots of the five consecutive slots.

S401: In the first time window, the terminal device performs one of the following processes: not adjusting the transmit power; adjusting the transmit power to a fourth transmit power; or adjusting the transmit power in a first power interval.

The second transmit power is a transmit power of the terminal device before the terminal device receives, in a current slot, TPC sent by the network device. The first power interval includes a current transmit power of the terminal, and when the transmit power of the terminal device is adjusted in the first transmit power interval, a phase of the uplink signal of the terminal device does not jump.

For example, the current transmit power of the terminal device is 10.

If a process performed by the terminal device is not adjusting the transmit power in the first time window, the terminal device always keeps the transmit power of the terminal device at 10 in the first time window.

If the process performed by the terminal device is adjusting the transmit power of the terminal device to the fourth transmit power in the first time window, where a value of the fourth transmit power is 10, the terminal device always keeps the transmit power of the terminal device at 10 in the first time window.

If the process performed by the terminal device is adjusting the transmit power of the terminal device in the first power interval in the first time window, after receiving the TPC from the network device, the terminal device determines whether the adjusted transmit power is within the first power interval after the terminal device adjusts the transmit power based on the TPC.

If the adjusted transmit power is within the first power interval, the terminal device adjusts the transmit power of the terminal device based on the TPC.

If the adjusted transmit power is not within the first power interval, the terminal device determines whether the TPC is used to indicate the terminal device to increase the transmit power or indicate the terminal device to reduce the transmit power.

If the TPC indicates the terminal device to increase the transmit power, the terminal device adjusts the transmit power to a right endpoint of a second interval. That is, the terminal device adjusts the transmit power to 11.

If the TPC indicates the terminal device to reduce the transmit power, the terminal device adjusts the transmit power to a left endpoint of the second interval. That is, the terminal device adjusts the transmit power to 6.

Based on the foregoing technical solution, when the network device performs joint channel estimation, the terminal device controls a phase of the uplink signal of the terminal device not to jump. This resolves a problem that joint channel estimation performed by the network device is inaccurate due to the phase jump of the uplink signal of the terminal device.

In a possible implementation, as shown in FIG. 4, before S400, the method further includes S402 and S403.

S402: The network device sends the third indication information to the terminal device. Accordingly, the terminal device receives the third indication information from the network device.

For descriptions of the third indication information, refer to S400. Details are not described herein again.

S403: The network device sends fourth indication information to the terminal device. Accordingly, the terminal device receives the fourth indication information from the network device.

The fourth indication information is used to indicate the network device to enable joint channel estimation. In other words, the fourth indication information is used to indicate that the network device is performing joint channel estimation. In this case, the terminal device needs to determine the first time window, and adjust the transmit power of the terminal device in the first power interval in the first time window.

It should be noted that, in this embodiment of this application, the third indication information and the fourth indication information may be located in a same signaling message sent by the network device to the terminal device, or may be located in different signaling messages sent by the network device to the terminal device.

When the third indication information and the fourth indication information are located in a same signaling message sent by the network device to the terminal device, the signaling message sent by the network device to the terminal device is not only used to indicate the network device to enable joint channel estimation, but also used to indicate the first time window in which the network device performs joint channel estimation.

When the third indication information and the fourth indication information are two signaling messages sent by the network device, a signaling message that carries the fourth indication information in the two signaling messages is used to indicate the network device to enable joint channel estimation, and a signaling message that carries the third indication information in the two signaling messages is used to indicate the maximum quantity L of consecutive slots included in the first time window in which the network device performs joint channel estimation. In this case, the two signaling messages may not be sent at the same time. For example, when the terminal device initially accesses the network device, the network device sends, to the terminal device, the signaling message used to carry the third indication information. When the terminal device starts to perform uplink transmission, the network device sends, to the terminal device, the signaling message used to carry the fourth indication information.

It should be noted that time at which the network device performs joint channel estimation is related to a slot in which the terminal device sends the uplink data. If the terminal device sends the uplink data in L consecutive slots, the network device may perform joint channel estimation in the L slots.

In other words, the time at which the network device performs joint channel estimation is related to the slot in which the terminal device sends the uplink data.

Therefore, the network device indicates, to the terminal device, a time length for performing joint channel estimation by the network device. The terminal device determines the first time window based on the time length for performing joint channel estimation by the network device and a start time point at which the network device performs joint channel estimation.

Correspondingly, in a possible implementation of S400, the terminal device determines that a start time point of the first time window is an $H^{th}$ slot.

The $H^{th}$ slot meets any one of the following: an $(H-1)^{th}$ slot is a scheduled downlink slot, and the $H^{th}$ slot is a scheduled uplink slot (denoted as a condition 1); the $(H-1)^{th}$ slot is an unscheduled slot, and the $H^{th}$ slot is a scheduled uplink slot (denoted as a condition 2); or the network device completes one joint channel estimation in an $(H-L)^{th}$ slot to the $(H-1)^{th}$ slot, and the $H^{th}$ slot is a scheduled uplink slot (denoted as a condition 3).

The terminal device determines that the first time window in which the network device performs joint channel estimation includes Q consecutive scheduled uplink slots starting from the $H^{th}$ slot. Q is a positive integer less than or equal to L.

In this case, the terminal device adjusts the transmit power of the terminal device in the first power interval in the Q consecutive uplink slots starting from the $H^{th}$ slot. In other words, the terminal device adjusts the transmit power of the terminal device in the first power interval in the $H^{th}$ slot to an $(H+Q)^{th}$ slot.

Figure 5:
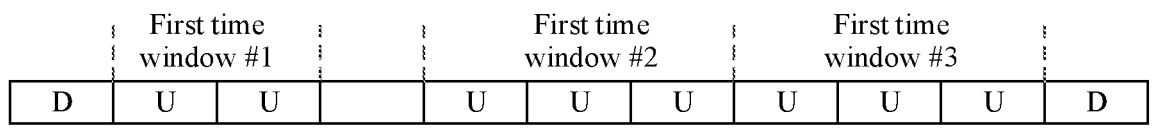
FIG. 5 is a schematic diagram of a first time window according to an embodiment of this application.

With reference to FIG. 5, the following describes a process in which the terminal device determines the first time window by using an example in which the maximum window length of the first time window is three slots.

FIG. 5 shows 11 consecutive slots, and the 11 slots are respectively denoted as a first slot, a second slot, . . . , and an eleventh slot from left to right.

The first slot is a downlink slot, the network device does not perform joint channel estimation in the slot, and the terminal device determines that the slot is not a start slot of the first time window.

The second slot is an uplink slot, and the first slot is a downlink slot, which meets the foregoing condition 1. Therefore, the terminal device determines that the second slot is a start slot of a first time window #1.

The third slot is also an uplink slot, and the terminal device determines that the third slot is the second slot in the first time window #1.

The fourth slot is an unscheduled slot, the network device does not perform joint channel estimation in the slot, and the terminal device determines that the fourth slot is not a slot in the first time window #1. The first time window #1 ends at the third slot.

The fifth slot is an uplink slot, and the fourth slot is an unscheduled slot, which meets the foregoing condition 2. Therefore, the terminal device determines that the fifth slot is a start slot of a first time window #2.

Both the sixth slot and the seventh slot are uplink slots, and the terminal device determines that both the sixth slot and the seventh slot are slots in the first time window #2. Because the maximum window length of the first time window is three slots, the terminal device determines that the first time window #2 ends at the seventh slot.

The eighth slot is an uplink slot, and the seventh slot is a slot at which a previous first time window ends (that is, the network device completes one joint channel estimation in the fifth slot to the seventh slot), which meets the foregoing condition 3. Therefore, the terminal device determines that the eighth slot is a start slot of a first time window #3.

Both the ninth slot and the tenth slot are uplink slots, and the terminal device determines that both the ninth slot and the tenth slot are slots in the first time window #3. Because the maximum window length of the first time window is three slots, the terminal device determines that the first time window #3 ends at the tenth slot.

The eleventh slot is a downlink slot, the network device does not perform joint channel estimation in the slot, and the terminal device determines that the slot is not a start slot of the first time window.

Based on the foregoing technical solution, the terminal device may determine, based on the quantity of consecutive slots required by the network device to perform joint channel estimation and a slot in which the network device starts to perform joint channel estimation, the first time window in which the network device performs joint channel estimation.

Figure 6:
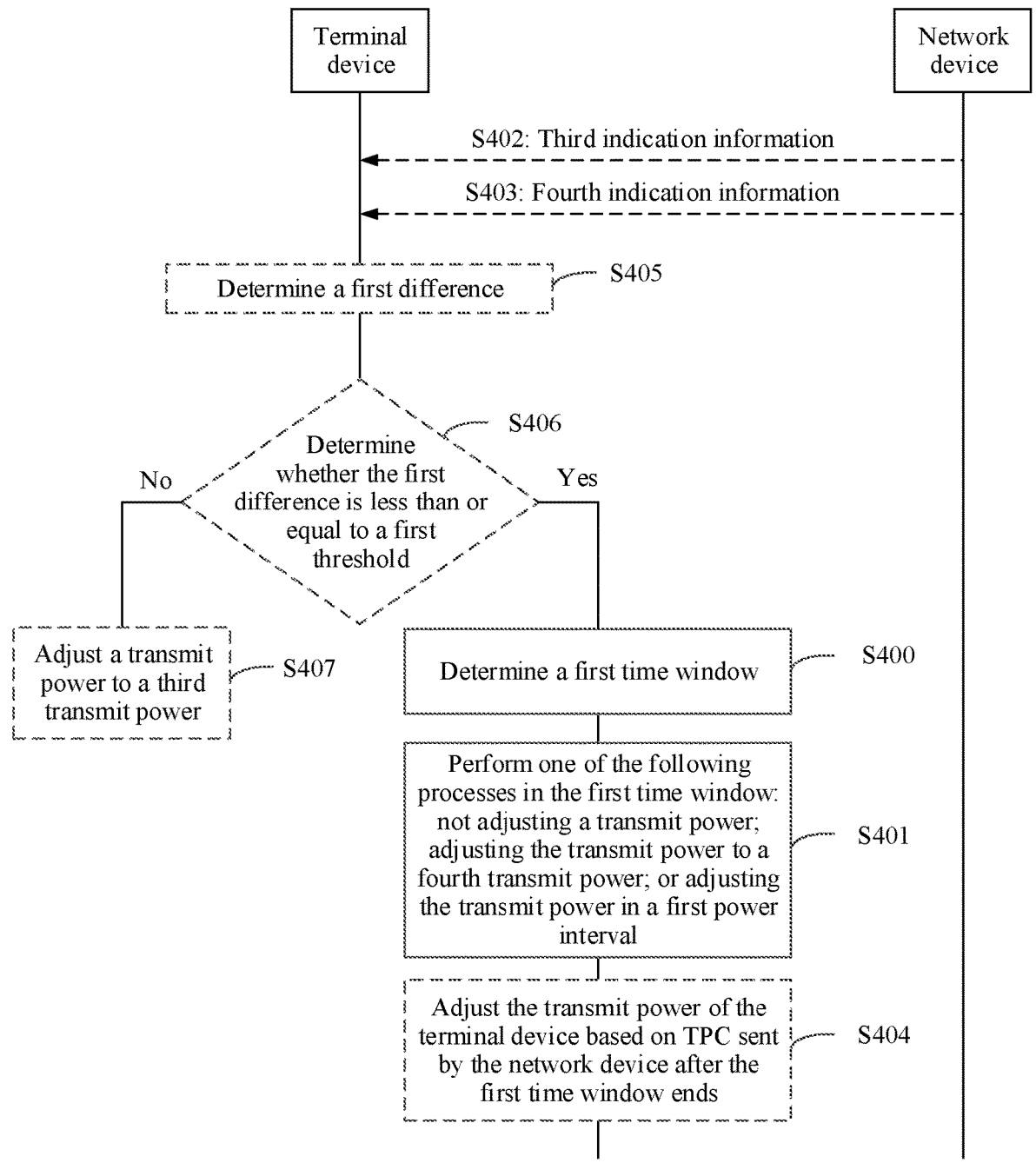
FIG. 6 is a schematic flowchart of a still yet another power control method according to an embodiment of this application.

In a possible implementation, as shown in FIG. 6, after S401, the method further includes:

S404: After the first time window ends, the terminal device adjusts the transmit power of the terminal device based on the TPC sent by the network device.

In a possible implementation, if the terminal device transmits the uplink data in K consecutive slots, and the K consecutive slots include a plurality of first time windows, the terminal device adjusts the transmit power of the terminal device in the first slot after the first time window ends. K is a positive integer greater than or equal to 2 L.

For example, the terminal device transmits the uplink data in 10 consecutive slots, and a value of L is 3.

In this case, the 10 consecutive slots include three first time windows: a first time window #4 including the first slot to the third slot, a first time window #5 including the fourth slot to the sixth slot, and a first time window #6 including the seventh slot to the ninth slot. The network device separately performs joint channel estimation in the three first time windows: the first time window #4, the first time window #5, and the first time window #6.

The terminal device adjusts, in the first slot (that is, the fourth slot) after the first time window #4 ends, the transmit power of the terminal device based on the TPC sent by the network device.

The terminal device adjusts, in the first slot (that is, the seventh slot) after the first time window #5 ends, the transmit power of the terminal device based on the TPC sent by the network device.

The terminal device adjusts, in the first slot (that is, the tenth slot) after the first time window #6 ends, the transmit power of the terminal device based on the TPC sent by the network device.

It should be noted that, in the three slots of the first time window #4 (or the first time window #5, or the first time window #6), if the network device sends the TPC to the terminal device, the terminal device adjusts the transmit power of the terminal device in the first power interval based on the TPC. The terminal device does not trigger a power jump point in the three slots.

In the fourth slot after the first time window #1 ends, the network device sends the TPC to the terminal device. Regardless of whether the power jump point is triggered after the terminal device adjusts the transmit power of the terminal device based on a power adjustment value indicated by the TPC, the terminal device adjusts the transmit power of the terminal device based on the power adjustment value indicated by the TPC.

Based on the foregoing technical solution, the terminal device can adjust the transmit power of the terminal device in time when the network device completes joint channel estimation. This improves quality of the uplink data sent by the terminal device.

In a possible implementation, as shown in FIG. 6, after S403, the method further includes:

S405: The terminal device determines a first difference.

The first difference is an absolute value of a difference between the current transmit power of the terminal device and a third transmit power of the terminal device. The third transmit power is a transmit power obtained after the network device indicates the terminal device to adjust the transmit power.

S406: The terminal device determines whether the first difference is less than or equal to a first threshold.

In a possible implementation, the first threshold may be preconfigured for the terminal device, or may be indicated by the network device to the terminal device by using indication information. This is not limited in this application.

It should be noted that when the first difference is less than or equal to the first threshold, the difference between the current transmit power of the terminal device and the third transmit power of the terminal device is relatively small. In this case, adjusting the transmit power by the terminal device also has relatively small impact on link quality of an uplink. In this case, the terminal device determines to adjust the transmit power in a preset interval, so that the phase of the uplink signal of the terminal device does not jump, and the network device can normally perform joint channel estimation.

When the first difference is greater than the first threshold, the difference between the current transmit power of the terminal device and the third transmit power of the terminal device is relatively large. In this case, link quality of the uplink of the terminal device is relatively poor. If the terminal device does not adjust the uplink transmit power, an uplink failure may be caused. In this case, the terminal device adjusts the current transmit power to the third transmit power, to preferentially ensure that the uplink transmission link does not fail.

Therefore, when the first difference is less than or equal to the first threshold, the terminal device performs S400 and S401, so that the network device can normally perform joint channel estimation.

When the first difference is greater than the first threshold, the terminal device performs S407, to ensure link quality of the uplink transmission link of the terminal device.

S407: The terminal device adjusts the transmit power of the terminal device to the third transmit power.

For example, the first threshold of the terminal device is 2. The current transmit power of the terminal device is 10, and the power jump point is 11.

If the network device indicates that the third transmit power obtained after the terminal device adjusts the transmit power is 18 or 19, the first difference is less than or equal to the first threshold. In this case, the terminal device still sends the uplink data at a transmit power of 17.

If the network device indicates that the third transmit power obtained after the terminal device adjusts the transmit power is greater than 19, the first difference is greater than the first threshold. In this case, the terminal device adjusts the transmit power of the terminal device to the third transmit power.

Specifically, when the network device indicates the terminal device to adjust the transmit power to 18 or 19, the terminal device still sends the uplink data at the transmit power of 17.

When the network device indicates the terminal device to adjust the transmit power to 20 or above, the terminal device adjusts the transmit power based on an indication of the network device.

Based on the foregoing technical solution, when the signal quality of the uplink of the terminal device is relatively poor, if a transmit power adjustment value indicated by the network device to the terminal device is relatively large, the terminal device adjusts the transmit power based on the transmit power adjustment value indicated by the network device. This can avoid an uplink failure caused by relatively low transmit power of the terminal device.

Figure 7:
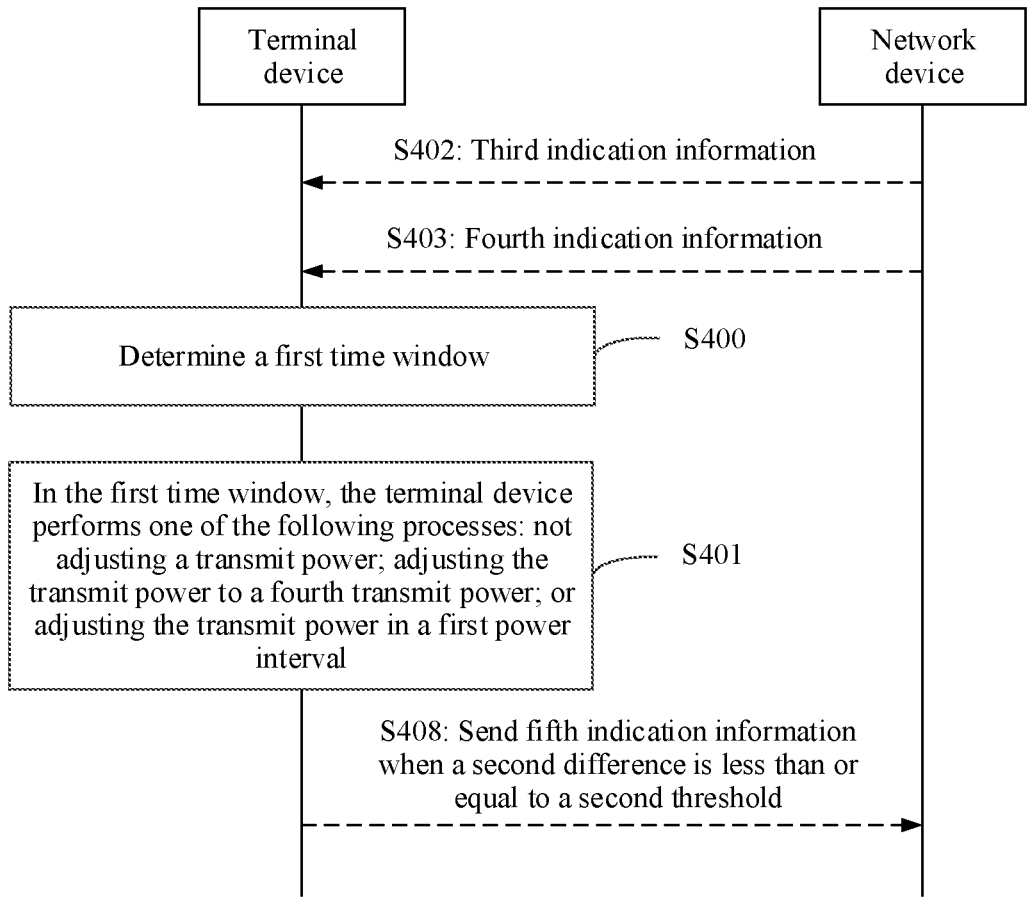
FIG. 7 is a schematic flowchart of a further power control method according to an embodiment of this application.

In a possible implementation, with reference to FIG. 5, as shown in FIG. 7, after S401, the method further includes:

S408: The terminal device sends fifth indication information to the network device when a second difference is less than or equal to a second threshold. Correspondingly, the network device receives the fifth indication information from the terminal device. The second difference is an absolute value of a difference between the current transmit power of the terminal device and each first transmit power of the terminal device. The second threshold may be preconfigured for the terminal device, or may be indicated by the network device to the terminal device by using indication information. This is not limited in this application.

The fifth indication information is used to indicate that the second difference is less than or equal to the second threshold.

When the second difference is less than or equal to the second threshold, it indicates that the current transmit power of the terminal device is close to the first transmit power. If the network device indicates the terminal device to adjust the transmit power, the phase of the uplink signal of the terminal device is likely to jump. In this case, the network device does not perform joint channel estimation when indicating the terminal device to adjust the transmit power next time.

Based on this, the terminal device sends the fifth indication information to the network device, so that the network device can determine that the current transmit power of the terminal device is close to the first transmit power, and the network device may not perform joint channel estimation when indicating the terminal device to adjust the transmit power next time.

The solutions in the foregoing embodiments of this application may be combined when there is no contradiction.

The foregoing mainly describes the solutions in embodiments of this application from a perspective of interaction between network elements. It may be understood that, to implement the foregoing functions, the network elements such as the network device and the terminal device include at least one of corresponding hardware structures and software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the network device and the terminal device may be divided into function units based on the method examples. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, division into the units is an example, and is merely a logical function division. In actual implementation, another division manner may be used.

Figure 8:
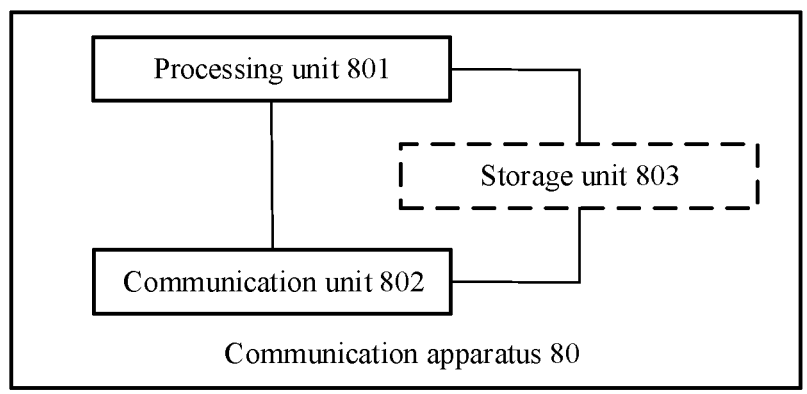
FIG. 8 is a schematic diagram of a structure of a communication apparatus according to an embodiment of this application.

When an integrated unit is used, FIG. 8 is a schematic diagram of a possible structure of a communication apparatus (denoted as a communication apparatus 80) in the foregoing embodiments. The communication apparatus 80 includes a processing unit 801 and a communication unit 802, and may further include a storage unit 803. The schematic diagram of the structure shown in FIG. 8 may be used to show structures of the network device and the terminal device in the foregoing embodiments. When the schematic diagram of the structure shown in FIG. 8 is used to show a structure of the terminal device in the foregoing embodiments, the processing unit 801 is configured to control and manage actions of the terminal device, for example, control the terminal device to perform S201, S202, and S203 in FIGS. 2, S201, S202, S203, S302, and S303 in FIG. 3*a*, S201, S202, and S203 in FIG. 3*b*, S400, S401, S402, and S403 in FIGS. 4, S400, S401, S402, S403, S404, S405, S406, and S407 in FIGS. 6, S400, S401, S402, S403, and S408 in FIG. 7, and/or actions performed by the terminal device in another process described in embodiments of this application. The processing unit 801 may communicate with another network entity by using the communication unit 802, for example, communicate with the network device shown in FIG. 1. The storage unit 803 is configured to store program code and data of the terminal device.

When the schematic diagram of the structure shown in FIG. 8 is used to show the structure of the terminal device in the foregoing embodiments, the communication apparatus 80 may be a terminal device, or may be a chip in the terminal device.

When the schematic diagram of the structure shown in FIG. 8 is used to show a structure of the network device in the foregoing embodiments, the processing unit 801 is configured to control and manage actions of the network device, for example, control the network device to perform S201 and S203 in FIGS. 2, S201, S203, S301, and S302 in FIG. 3*a*, S201, S203, S304, and S305 in FIG. 3*b*, S501 in FIGS. 4, S402 and S403 in FIGS. 6, S402, S403, and S408 in FIG. 7, and/or actions performed by the network device in another process described in embodiments of this application. The processing unit 801 may communicate with another network entity by using the communication unit 802, for example, communicate with the network device shown in FIG. 1. The storage unit 803 is configured to store program code and data of the terminal device.

When the schematic diagram of the structure shown in FIG. 8 is used to show the structure of the network device in the foregoing embodiments, the communication apparatus 80 may be a network device, or may be a chip in the network device.

When the communication apparatus 80 is a terminal device or a network device, the processing unit 801 may be a processor or a controller, and the communication unit 802 may be a communication interface, a transceiver, a transceiver device, a transceiver circuit, a transceiver apparatus, or the like. The communication interface is a general term, and may include one or more interfaces. The storage unit 803 may be a memory. When the communication apparatus 80 is a chip in a terminal device or a network device, the processing unit 801 may be a processor or a controller, and the communication unit 802 may be an input interface and/or an output interface, a pin, a circuit, or the like. The storage unit 803 may be a storage unit (for example, a register or a cache) in the chip, or may be a storage unit (for example, a read-only memory (read-only memory, ROM for short) or a random access memory (random access memory, RAM for short)) that is in the terminal device or the network device and that is located outside the chip.

The communication unit may also be referred to as a transceiver unit. An antenna and a control circuit that have receiving and sending functions in the communication apparatus 80 may be considered as the communication unit 802 of the communication apparatus 80, and a processor that has a processing function may be considered as the processing unit 801 of the communication apparatus 80. Optionally, a component configured to implement a receiving function in the communication unit 802 may be considered as a receiving unit. The receiving unit is configured to perform a receiving step in embodiments of this application. The receiving unit may be a receiving device, a receiver, a receiver circuit, or the like.

When the integrated unit in FIG. 8 is implemented in a form of a software function module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in embodiments of this application. The storage medium storing the computer software product includes any medium that can store program code, such as a USB flash drive, a removable hard disk, a read-only memory, a random access memory, a magnetic disk, or an optical disc.

The unit in FIG. 8 may alternatively be referred to as a module. For example, the processing unit may be referred to as a processing module.

Figure 9:
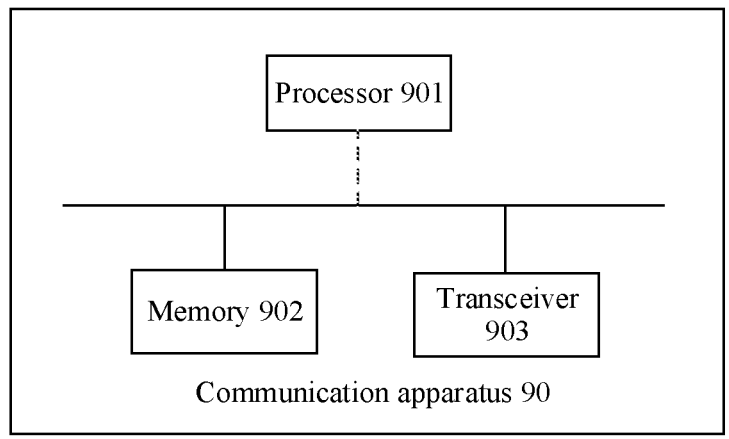
FIG. 9 is a schematic diagram of a hardware structure of a communication apparatus according to an embodiment of this application.
Figure 10:
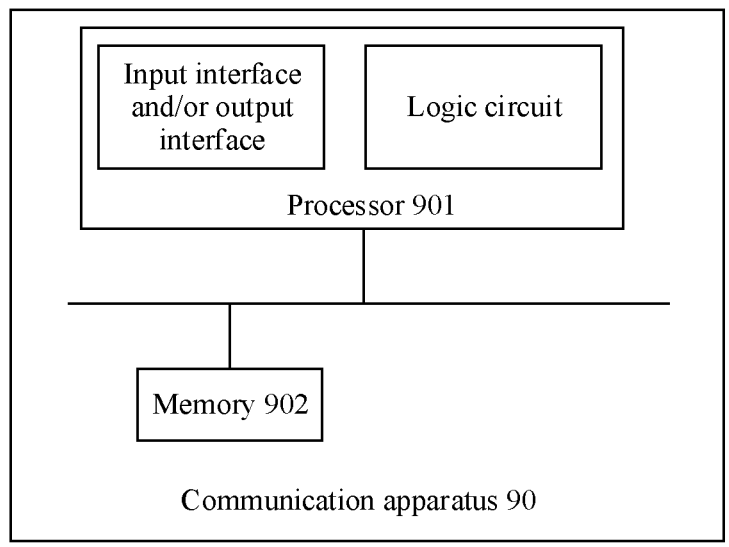
FIG. 10 is a schematic diagram of another hardware structure of a communication apparatus according to an embodiment of this application.

An embodiment of this application further provides a schematic diagram of a hardware structure of a communication apparatus (denoted as a communication apparatus 90). Refer to FIG. 9 or FIG. 10, the communication apparatus 90 includes a processor 901. Optionally, the communication apparatus 90 further includes a memory 902 connected to the processor 901.

In a first possible implementation, refer to FIG. 9, the communication apparatus 90 further includes a transceiver 903. The processor 901, the memory 902, and the transceiver 903 are connected through a bus. The transceiver 903 is configured to communicate with another device or a communication network. Optionally, the transceiver 903 may include a transmitting device and a receiving device. A component configured to implement a receiving function in the transceiver 903 may be considered as the receiving device. The receiving device is configured to perform a receiving step in embodiments of this application. A component configured to implement a sending function in the transceiver 903 may be considered as the transmitting device. The transmitting device is configured to perform a sending step in embodiments of this application.

Based on the first possible implementation, the schematic diagram of the structure shown in FIG. 9 may be used to show a structure of the network device or the terminal device in the foregoing embodiments.

When the schematic diagram of the structure shown in FIG. 9 is used to show a structure of the terminal device in the foregoing embodiments, the processor 901 is configured to control and manage actions of the terminal device, for example, the processor 901 is configured to support the terminal device in performing S201, S202, and S203 in FIGS. 2, S201, S202, S203, S302, and S303 in FIG. 3a, S201, S202, and S203 in FIG. 3b, S400, S401, S402, and S403 in FIGS. 4, S400, S401, S402, S403, S404, S405, S406, and S407 in FIGS. 6, S400, S401, S402, S403, and S408 in FIG. 7, and/or actions performed by the terminal device in another process described in embodiments of this application. The processor 901 may communicate with another network entity by using the transceiver 903, for example, communicate with the network device shown in FIG. 1. The memory 902 is configured to store program code and data of the terminal device.

When the schematic diagram of the structure shown in FIG. 9 is used to show a structure of the network device in the foregoing embodiments, the processor 901 is configured to control and manage actions of the network device, for example, the processor 901 is configured to support the network device in performing S201 and S203 in FIGS. 2, S201, S203, S301, and S302 in FIG. 3a, S201, S203, S304, and S305 in FIG. 3b, S501 in FIGS. 4, S402 and S403 in FIGS. 6, S402, S403, and S408 in FIG. 7, and/or actions performed by the network device in another process described in embodiments of this application. The processor 901 may communicate with another network entity by using the transceiver 903, for example, communicate with the terminal device shown in FIG. 1. The memory 902 is configured to store program code and data of the network device.

In a second possible implementation, the processor 901 includes a logic circuit and at least one of an input interface and an output interface. The output interface is configured to perform a sending action in a corresponding method, and the input interface is configured to perform a receiving action in the corresponding method.

Based on the second possible implementation, refer to FIG. 10, the schematic diagram of the structure shown in FIG. 10 may be used to show a structure of the network device or the terminal device in the foregoing embodiments.

When the schematic diagram of the structure shown in FIG. 10 is used to show a structure of the terminal device in the foregoing embodiments, the processor 901 is configured to control and manage actions of the terminal device, for example, the processor 901 is configured to support the terminal device in performing S201, S202, and S203 in FIG. 2, S201, S202, S203, S302, and S303 in FIG. 3a, S201, S202, and S203 in FIG. 3b, S400, S401, S402, and S403 in FIG. 4, S400, S401, S402, S403, S404, S405, S406, and S407 in FIG. 6, S400, S401, S402, S403, and S408 in FIG. 7, and/or actions performed by the terminal device in another process described in embodiments of this application. The processor 901 may communicate with another network entity by using at least one of the input interface and the output interface, for example, communicate with the network device shown in FIG. 1. The memory 902 is configured to store program code and data of the terminal device.

When the schematic diagram of the structure shown in FIG. 10 is used to show a structure of the network device in the foregoing embodiments, the processor 901 is configured to control and manage actions of the network device, for example, the processor 901 is configured to support the network device in performing S201 and S203 in FIG. 2, S201, S203, S301, and S302 in FIG. 3a, S201, S203, S304, and S305 in FIG. 3b, S501 in FIG. 4, S402 and S403 in FIGS. 6, S402, S403, and S408 in FIG. 7, and/or actions performed by the network device in another process described in embodiments of this application. The processor 901 may communicate with another network entity by using at least one of the input interface and the output interface, for example, communicate with the terminal device shown in FIG. 1. The memory 902 is configured to store program code and data of the network device.

FIG. 9 and FIG. 10 may alternatively show a system chip in the network device. In this case, the actions performed by the network device may be implemented by the system chip. For a specific action performed, refer to the foregoing descriptions. Details are not described herein again. FIG. 9 and FIG. 10 may alternatively show a system chip in the terminal device. In this case, the actions performed by the terminal device may be implemented by the system chip. For a specific action performed, refer to the foregoing descriptions. Details are not described herein again.

In addition, embodiments of this application further provide schematic diagrams of hardware structures of a terminal device (denoted as a terminal device 110) and a network device (denoted as a network device 120). For details, refer to FIG. 11 and FIG. 12 respectively.

Figure 11:
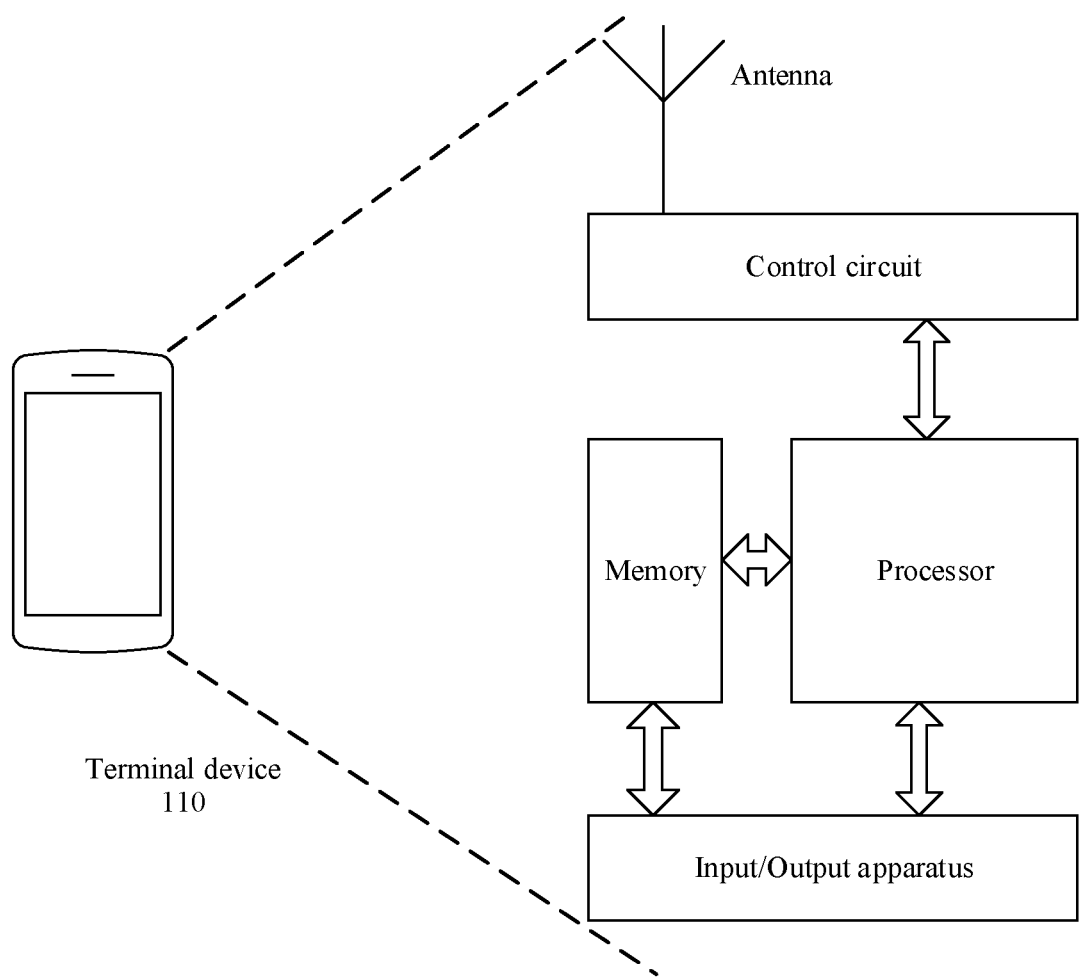
FIG. 11 is a schematic diagram of a hardware structure of a terminal device according to an embodiment of this application.

FIG. 11 is the schematic diagram of the hardware structure of the terminal device 110. For ease of description, FIG. 11 shows only main components of the terminal device. As shown in FIG. 11, the terminal device 110 includes a processor, a memory, a control circuit, an antenna, and an input/output apparatus.

The processor is mainly configured to: process a communication protocol and communication data, control the entire terminal device, execute a software program, and process data of the software program, for example, control the terminal device to perform S201, S202, and S203 in FIG. 2, S201, S202, S203, S302, and S303 in FIG. 3a, S201, S202, and S203 in FIG. 3b, S400, S401, S402, and S403 in FIG. 4, S400, S401, S402, S403, S404, S405, S406, and S407 in FIG. 6, S400, S401, S402, S403, and S408 in FIG. 7, and/or actions performed by the terminal device in another process described in embodiments of this application. The memory is mainly configured to store the software program and data. The control circuit (which may also be referred to as a radio frequency circuit) is mainly configured to perform conversion between a baseband signal and a radio frequency signal, and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the memory, interpret and execute instructions of the software program, and process the data of the software program. When the processor needs to send data through the antenna, after performing baseband processing on the to-be-sent data, the processor outputs a baseband signal to a control circuit in the control circuit. The control circuit performs radio frequency processing on the baseband signal and then sends a radio frequency signal to the outside in the form of the electromagnetic wave through the antenna. When data is sent to the terminal device, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

Figure 12:
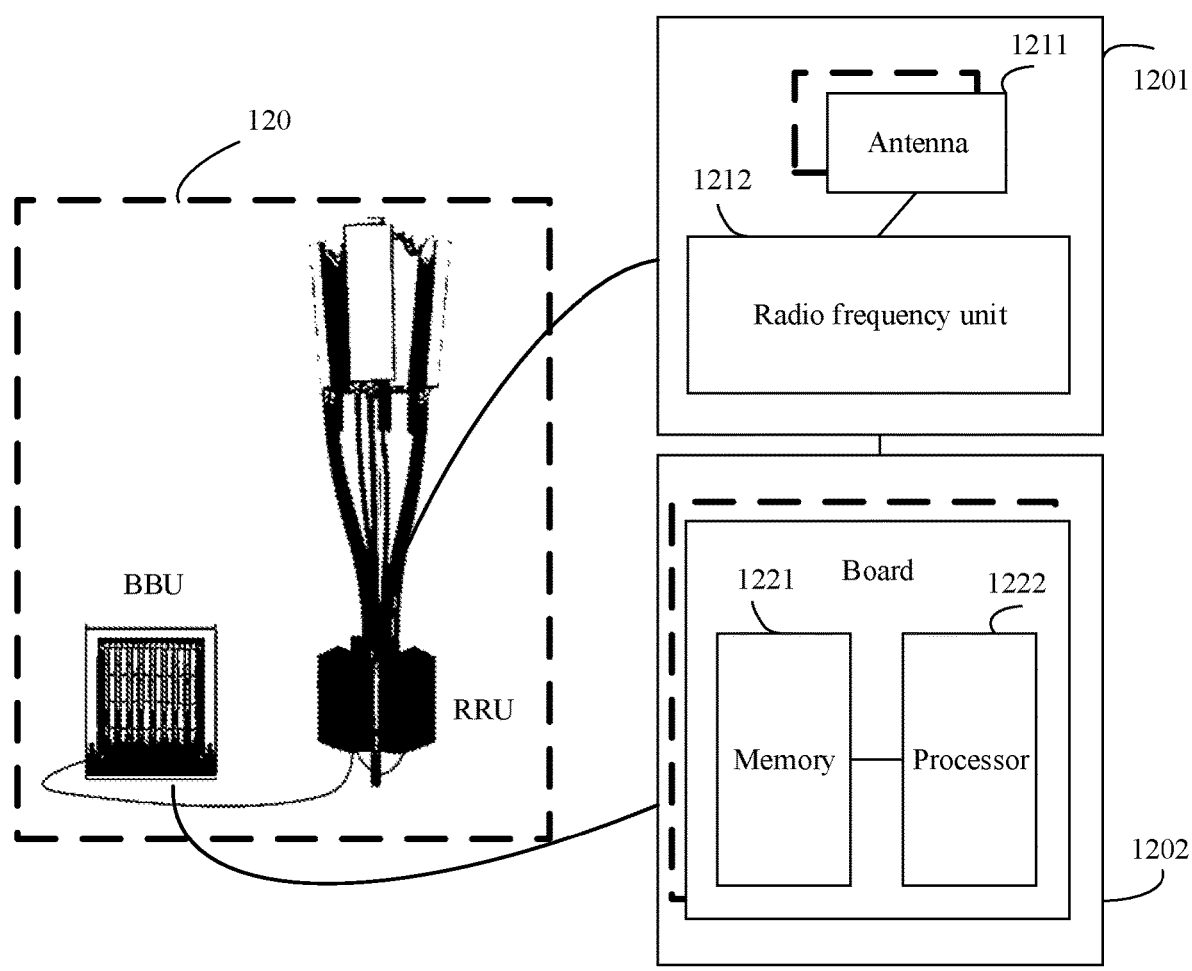
FIG. 12 is a schematic diagram of a hardware structure of a network device according to an embodiment of this application.

FIG. 12 is the schematic diagram of the hardware structure of the network device 120. The network device 120 may include one or more radio frequency units, such as a remote radio unit (remote radio unit, RRU for short) 1201 and one or more baseband units (baseband units, BBUs for short) (which may also be referred to as digital units (digital units, DUs for short)) 1202.

The RRU 1201 may be referred to as a transceiver unit, a transceiver device, a transceiver circuit, a transceiver, or the like, and may include at least one antenna 1211 and a radio frequency unit 1212. The RRU 1201 is mainly configured to receive and send a radio frequency signal and perform conversion between a radio frequency signal and a baseband signal. The RRU 1201 and the BBU 1202 may be physically disposed together, or may be physically disposed separately, for example, a distributed base station.

The BBU 1202 is a control center of the network device, may also be referred to as a processing unit, and is mainly configured to complete baseband processing functions such as channel coding, multiplexing, modulation, and spectrum spreading.

In an embodiment, the BBU 1202 may include one or more boards. A plurality of boards may jointly support a radio access network (such as an LTE network) of a single access standard, or may separately support radio access networks (such as an LTE network, a 5G network, or another network) of different access standards. The BBU 1202 further includes a memory 1221 and a processor 1222. The memory 1221 is configured to store necessary instructions and data. The processor 1222 is configured to control the network device to perform a necessary action. The memory 1221 and the processor 1222 may serve one or more boards. In other words, a memory and a processor may be disposed on each board. Alternatively, a plurality of boards may share a same memory and a same processor. In addition, a necessary circuit may further be disposed on each board.

It should be understood that the network device 120 shown in FIG. 12 can perform S201 and S203 in FIGS. 2, S201, S203, S301, and S302 in FIG. 3a, S201, S203, S304, and S305 in FIG. 3b, S501 in FIGS. 4, S402 and S403 in FIGS. 6, S402, S403, and S408 in FIG. 7, and/or actions performed by the network device in another process described in embodiments of this application. Operations, functions, or operations and functions of modules in the network device 120 are separately set to implement corresponding procedures in the foregoing method embodiments. For details, refer to the descriptions in the foregoing method embodiments. To avoid repetition, detailed descriptions are properly omitted herein.

In an implementation process, the steps of the methods in embodiments may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

The processor in this application may include but is not limited to at least one of the following computing devices that run software: a central processing unit (central processing unit, CPU), a microprocessor, a digital signal processor (DSP), a microcontroller unit (microcontroller unit, MCU), or an artificial intelligence processor. Each computing device may include one or more cores configured to perform an operation or processing by executing software instructions. The processor may be an independent semiconductor chip; or may be integrated with another circuit to form a semiconductor chip, for example, may form a SoC (system-on-a-chip) with another circuit (for example, a codec circuit, a hardware acceleration circuit, or various buses and interface circuits); or may be integrated into an ASIC as a built-in processor of the ASIC. The ASIC integrated with the processor may be independently packaged or may be packaged together with another circuit. In addition to the core configured to perform an operation or processing by executing software instructions, the processor may further include a necessary hardware accelerator, for example, a field programmable gate array (field programmable gate array, FPGA), a PLD (programmable logic device), or a logic circuit that implements a dedicated logic operation.

The memory in embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed to a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal device.

An embodiment of this application further provides a chip. The chip includes a processor and an interface circuit. The interface circuit is coupled to the processor. The processor is configured to run computer programs or instructions, to implement the foregoing method. The interface circuit is used to communicate with another module outside the chip.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD for short)), or the like.

With reference to the foregoing descriptions, this application further provides the following embodiments:

Embodiment 1: A power control method, including:

A terminal device determines first indication information. The first indication information is used to indicate one or more first transmit powers of the terminal device, and the first transmit power is a transmit power corresponding to a phase jump of an uplink signal of the terminal device.

The terminal device sends the first indication information to a network device.

Embodiment 2: The method according to Embodiment 1, where the first indication information includes one or more first values, and the one or more first values are in a one-to-one correspondence with the one or more first transmit powers.

The first value is used to represent a difference between a first transmit power corresponding to the first value and a current transmit power.

Embodiment 3: The method according to Embodiment 1 or 2, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 4: The method according to Embodiment 3, where the one or more first transmit powers include an endpoint of each of the plurality of transmit power intervals.

Embodiment 5: The method according to Embodiment 3, where the current transmit power of the terminal device is a second transmit power, and the one or more first transmit powers include two first transmit powers that have a smallest difference from the second transmit power.

Embodiment 6: The method according to Embodiment 3, where the current transmit power of the terminal device is a second transmit power, and the one or more first transmit powers include one first transmit power that has a smallest difference from the second transmit power.

Embodiment 7: The method according to Embodiment 3, where the current transmit power of the terminal device is a second transmit power, and the one or more first transmit powers include a first transmit power that is greater than the second transmit power and that has a smallest difference from the second transmit power.

Embodiment 8: The method according to Embodiment 3, where the current transmit power of the terminal device is a second transmit power, and the one or more first transmit powers include a first transmit power that is less than the second transmit power and that has a smallest difference from the second transmit power.

Embodiment 9: The method according to any one of Embodiments 4 to 8, further including:

The terminal device determines whether an absolute value of a smallest difference between the current transmit power and the endpoint of each of the plurality of transmit power intervals is less than or equal to a first threshold.

If the absolute value of the smallest difference between the current transmit power and the endpoint of each of the plurality of transmit power intervals is less than or equal to the first threshold, the terminal device sends the first indication information to the network device.

Embodiment 10: The method according to any one of Embodiments 1 to 9, where before the terminal device sends the first indication information to the network device, the method further includes:

The terminal device receives second indication information from the network device. The second indication information is used to indicate the terminal device to send the first indication information, and the second indication information is carried in any one of the following: an RRC message, a MAC CE, or DCI.

The terminal device sends the first indication information to the network device in response to the second indication information. The first indication information is carried in a MAC CE sent by the terminal device, and the MAC CE carrying the first indication information is any one of the following: a MAC CE carrying a PHR, a newly added MAC CE, or a MAC CE sent in an uplink slot scheduled by DCI including TPC.

Embodiment 11: The method according to Embodiment 10, where the second indication information is used to indicate the terminal device to periodically report the first indication information.

Alternatively, the second indication information is used to indicate the terminal device to send the first indication information to the network device when the absolute value of the smallest difference between the current transmit power and the endpoint of each of the plurality of transmit power intervals is less than or equal to the first threshold.

Alternatively, the second indication information is used to indicate the terminal device to report the first indication information at a preset time point.

Embodiment 12: The method according to Embodiment 11, where the second indication information is further used to indicate a reporting manner of the first indication information and a quantity of first transmit powers in the first indication information.

Embodiment 13: A power control method, including:

A network device receives first indication information from a terminal device. The first indication information is used to indicate one or more first transmit powers of the terminal device, and the first transmit power is a transmit power corresponding to a phase jump of an uplink signal of the terminal device.

Embodiment 14: The method according to Embodiment 13, where the first indication information includes one or more first values, and the one or more first values are in a one-to-one correspondence with the one or more first transmit powers.

The first value is used to represent a difference between a first transmit power corresponding to the first value and a current transmit power.

Embodiment 15: The method according to Embodiment 13 or 14, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 16: The method according to Embodiment 15, further including:

If the network device is performing joint channel estimation, the network device indicates the terminal device to adjust the transmit power of the terminal device in a first power interval. The first power interval is a transmit power interval that is in the plurality of transmit power intervals and that includes the current transmit power of the terminal device.

Embodiment 17: The method according to Embodiment 15, further including:

The network device determines a first slot. The transmit power of the terminal device in the first slot is adjusted beyond a first power interval, and the first power interval is a transmit power interval that is in the plurality of transmit power intervals and that includes the current transmit power of the terminal device.

The network device does not perform joint channel estimation in the first slot with a slot before the first slot.

Embodiment 18: The method according to any one of Embodiments 15 to 17, where the one or more first transmit powers include an endpoint of each of the plurality of transmit power intervals.

Embodiment 19: The method according to any one of Embodiments 15 to 17, where the current transmit power of the terminal device is a second transmit power, and the one or more first transmit powers include two first transmit powers that have a smallest difference from the second transmit power.

Embodiment 20: The method according to any one of Embodiments 15 to 17, where the current transmit power of the terminal device is a second transmit power, and the one or more first transmit powers include one first transmit power that has a smallest difference from the second transmit power.

Embodiment 21: The method according to any one of Embodiments 15 to 17, where the current transmit power of the terminal device is a second transmit power, and the one or more first transmit powers include a first transmit power that is greater than the second transmit power and that has a smallest difference from the second transmit power.

Embodiment 22: The method according to any one of Embodiments 15 to 17, where the current transmit power of the terminal device is a second transmit power, and the one or more first transmit powers include a first transmit power that is less than the second transmit power and that has a smallest difference from the second transmit power.

Embodiment 23: The method according to any one of Embodiments 13 to 22, further including:

The network device sends second indication information to the terminal device. The second indication information is used to indicate the terminal device to send the first indication information, the first indication information is carried in a MAC CE sent by the terminal device, and the second indication information is carried in any one of the following: an RRC message, a MAC CE, or DCI.

Embodiment 24: The method according to Embodiment 23, where the second indication information is used to indicate the terminal device to periodically report the first indication information.

Alternatively, the second indication information is used to indicate the terminal device to send the first indication information to the network device when an absolute value of a smallest difference between the current transmit power and the endpoint of each of the plurality of transmit power intervals is less than or equal to a first threshold.

Alternatively, the second indication information is used to indicate the terminal device to report the first indication information at a preset time point.

Embodiment 25: The method according to Embodiment 24, where the second indication information is further used to indicate a reporting manner of the first indication information and a quantity of first transmit powers in the first indication information.

Embodiment 26: A communication apparatus, including a processing unit and a communication unit.

The processing unit is configured to determine first indication information. The first indication information is used to indicate one or more first transmit powers of a terminal device, and the first transmit power is a transmit power corresponding to a phase jump of an uplink signal of the terminal device.

The communication unit is configured to send the first indication information to a network device.

Embodiment 27: The apparatus according to Embodiment 26, where the first indication information includes one or more first values, and the one or more first values are in a one-to-one correspondence with the one or more first transmit powers.

The first value is used to represent a difference between a first transmit power corresponding to the first value and a current transmit power.

Embodiment 28: The apparatus according to Embodiment 26 or 27, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 29: The apparatus according to Embodiment 28, where the one or more first transmit powers include an endpoint of each of the plurality of transmit power intervals.

Embodiment 30: The apparatus according to Embodiment 28, where the current transmit power of the terminal device is a second transmit power, and the one or more first transmit powers include two first transmit powers that have a smallest difference from the second transmit power.

Embodiment 31: The apparatus according to Embodiment 28, where the current transmit power of the terminal device is a second transmit power, and the one or more first transmit powers include one first transmit power that has a smallest difference from the second transmit power.

Embodiment 32: The apparatus according to Embodiment 28, where the current transmit power of the terminal device is a second transmit power, and the one or more first transmit powers include a first transmit power that is greater than the second transmit power and that has a smallest difference from the second transmit power.

Embodiment 33: The apparatus according to Embodiment 28, where the current transmit power of the terminal device is a second transmit power, and the one or more first transmit powers include a first transmit power that is less than the second transmit power and that has a smallest difference from the second transmit power.

Embodiment 34: The apparatus according to any one of Embodiments 29 to 33, where the processing unit is further configured to:

determine whether an absolute value of a smallest difference between the current transmit power and the endpoint of each of the plurality of transmit power intervals is less than or equal to a first threshold.

The processing unit is further configured to indicate the communication unit to send the first indication information to the network device.

Embodiment 35: The apparatus according to any one of Embodiments 26 to 34, where the communication unit is further configured to receive second indication information from the network device. The second indication information is used to indicate the terminal device to send the first indication information, and the second indication information is carried in any one of the following: an RRC message, a MAC CE, or DCI. The processing unit is further configured to indicate the communication unit to send the first indication information to the network device. The first indication information is carried in a MAC CE sent by the terminal device, and the MAC CE carrying the first indication information is any one of the following: a MAC CE carrying a PHR, a newly added MAC CE, or a MAC CE sent in an uplink slot scheduled by DCI including TPC.

Embodiment 36: The apparatus according to Embodiment 35, where the second indication information is used to indicate the terminal device to periodically report the first indication information.

Alternatively, the second indication information is used to indicate the terminal device to send the first indication information to the network device when the absolute value of the smallest difference between the current transmit power and the endpoint of each of the plurality of transmit power intervals is less than or equal to the first threshold.

Alternatively, the second indication information is used to indicate the terminal device to report the first indication information at a preset time point.

Embodiment 37: The apparatus according to Embodiment 36, where the second indication information is further used to indicate a reporting manner of the first indication information and a quantity of first transmit powers in the first indication information.

Embodiment 38: A communication apparatus, including a processing unit and a communication unit.

The processing unit is configured to indicate the communication unit to receive first indication information from a terminal device. The first indication information is used to indicate one or more first transmit powers of the terminal device, and the first transmit power is a transmit power corresponding to a phase jump of an uplink signal of the terminal device.

Embodiment 39: The apparatus according to Embodiment 38, where the first indication information includes one or more first values, and the one or more first values are in a one-to-one correspondence with the one or more first transmit powers.

The first value is used to represent a difference between a first transmit power corresponding to the first value and a current transmit power.

Embodiment 40: The apparatus according to Embodiment 38 or 39, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 41: The apparatus according to Embodiment 40, where the processing unit is further configured to:

if a network device is performing joint channel estimation, indicate the terminal device to adjust the transmit power of the terminal device in a first power interval, where the first power interval is a transmit power interval that is in the plurality of transmit power intervals and that includes the current transmit power of the terminal device.

Embodiment 42: The apparatus according to Embodiment 40, where the processing unit is further configured to:

determine a first slot, where the transmit power of the terminal device in the first slot is adjusted beyond a first power interval, and the first power interval is a transmit power interval that is in the plurality of transmit power intervals and that includes the current transmit power of the terminal device; and not perform joint channel estimation in the first slot with a slot before the first slot.

Embodiment 43: The apparatus according to any one of Embodiments 40 to 42, where the one or more first transmit powers include an endpoint of each of the plurality of transmit power intervals.

Embodiment 44: The apparatus according to any one of Embodiments 40 to 42, where the current transmit power of the terminal device is a second transmit power, and the one or more first transmit powers include two first transmit powers that have a smallest difference from the second transmit power.

Embodiment 45: The apparatus according to any one of Embodiments 40 to 42, where the current transmit power of the terminal device is a second transmit power, and the one or more first transmit powers include one first transmit power that has a smallest difference from the second transmit power.

Embodiment 46: The apparatus according to any one of Embodiments 40 to 42, where the current transmit power of the terminal device is a second transmit power, and the one or more first transmit powers include a first transmit power that is greater than the second transmit power and that has a smallest difference from the second transmit power.

Embodiment 47: The apparatus according to any one of Embodiments 40 to 42, where the current transmit power of the terminal device is a second transmit power, and the one or more first transmit powers include a first transmit power that is less than the second transmit power and that has a smallest difference from the second transmit power.

Embodiment 48: The apparatus according to any one of Embodiments 38 to 47, where the communication unit is further configured to:

send second indication information to the terminal device, where the second indication information is used to indicate the terminal device to send the first indication information, the first indication information is carried in a MAC CE sent by the terminal device, and the second indication information is carried in any one of the following: an RRC message, a MAC CE, or DCI.

Embodiment 49: The apparatus according to Embodiment 48, where the second indication information is used to indicate the terminal device to periodically report the first indication information.

Alternatively, the second indication information is used to indicate the terminal device to send the first indication information to the network device when an absolute value of a smallest difference between the current transmit power and the endpoint of each of the plurality of transmit power intervals is less than or equal to a first threshold.

Alternatively, the second indication information is used to indicate the terminal device to report the first indication information at a preset time point.

Embodiment 50: The apparatus according to Embodiment 49, where the second indication information is further used to indicate a reporting manner of the first indication information and a quantity of first transmit powers in the first indication information.

Embodiment 51: A communication apparatus, where the communication apparatus may be a terminal device, a chip in a terminal device, or a system-on-a-chip. The communication apparatus includes a processor and a memory. The memory stores instructions, and when the instructions are executed by the processor, the communication apparatus is enabled to perform the following steps: determining first indication information, where the first indication information is used to indicate one or more first transmit powers of the terminal device, and the first transmit power is a transmit power corresponding to a phase jump of an uplink signal of the terminal device; and sending the first indication information to a network device.

Embodiment 52: The apparatus according to Embodiment 51, where the first indication information includes one or more first values, and the one or more first values are in a one-to-one correspondence with the one or more first transmit powers.

The first value is used to represent a difference between a first transmit power corresponding to the first value and a current transmit power.

Embodiment 53: The apparatus according to Embodiment 51 or 52, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 54: The apparatus according to Embodiment 53, where the one or more first transmit powers include an endpoint of each of the plurality of transmit power intervals.

Embodiment 55: The apparatus according to Embodiment 53, where the current transmit power of the terminal device is a second transmit power, and the one or more first transmit powers include two first transmit powers that have a smallest difference from the second transmit power.

Embodiment 56: The apparatus according to Embodiment 53, where the current transmit power of the terminal device is a second transmit power, and the one or more first transmit powers include one first transmit power that has a smallest difference from the second transmit power.

Embodiment 57: The apparatus according to Embodiment 53, where the current transmit power of the terminal device is a second transmit power, and the one or more first transmit powers include a first transmit power that is greater than the second transmit power and that has a smallest difference from the second transmit power.

Embodiment 58: The apparatus according to Embodiment 53, where the current transmit power of the terminal device is a second transmit power, and the one or more first transmit powers include a first transmit power that is less than the second transmit power and that has a smallest difference from the second transmit power.

Embodiment 59: The apparatus according to any one of Embodiments 54 to 58, where the communication apparatus is further configured to perform the following steps: determining whether an absolute value of a smallest difference between the current transmit power and the endpoint of each of the plurality of transmit power intervals is less than or equal to a first threshold; and sending the first indication information to the network device.

Embodiment 60: The apparatus according to any one of Embodiments 51 to 59, where the communication apparatus is further configured to perform the following steps: receiving second indication information from the network device, where the second indication information is used to indicate the terminal device to send the first indication information, and the second indication information is carried in any one of the following: an RRC message, a MAC CE, or DCI; and sending the first indication information to the network device, where the first indication information is carried in a MAC CE sent by the terminal device, and the MAC CE carrying the first indication information is any one of the following: a MAC CE carrying a PHR, a newly added MAC CE, or a MAC CE sent in an uplink slot scheduled by DCI including TPC.

Embodiment 61: The apparatus according to Embodiment 60, where the second indication information is used to indicate the terminal device to periodically report the first indication information.

Alternatively, the second indication information is used to indicate the terminal device to send the first indication information to the network device when the absolute value of the smallest difference between the current transmit power and the endpoint of each of the plurality of transmit power intervals is less than or equal to the first threshold.

Alternatively, the second indication information is used to indicate the terminal device to report the first indication information at a preset time point.

Embodiment 62: The apparatus according to Embodiment 61, where the second indication information is further used to indicate a reporting manner of the first indication information and a quantity of first transmit powers in the first indication information.

Embodiment 63: A communication apparatus, where the communication apparatus may be a network device, a chip in a network device, or a system-on-a-chip. The communication apparatus includes a processor and a memory. The memory stores instructions, and when the instructions are executed by the processor, the communication apparatus is enabled to perform the following steps: receiving first indication information from a terminal device, where the first indication information is used to indicate one or more first transmit powers of the terminal device, and the first transmit power is a transmit power corresponding to a phase jump of an uplink signal of the terminal device.

Embodiment 64: The apparatus according to Embodiment 63, where the first indication information includes one or more first values, and the one or more first values are in a one-to-one correspondence with the one or more first transmit powers.

The first value is used to represent a difference between a first transmit power corresponding to the first value and a current transmit power.

Embodiment 65: The apparatus according to Embodiment 63 or 64, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 66: The apparatus according to Embodiment 65, where the communication apparatus is further configured to perform the following step: if the network device is performing joint channel estimation, indicating the terminal device to adjust the transmit power of the terminal device in a first power interval, where the first power interval is a transmit power interval that is in the plurality of transmit power intervals and that includes the current transmit power of the terminal device.

Embodiment 67: The apparatus according to Embodiment 65, where the communication apparatus is further configured to perform the following steps: determining a first slot, where the transmit power of the terminal device in the first slot is adjusted beyond a first power interval, and the first power interval is a transmit power interval that is in the plurality of transmit power intervals and that includes the current transmit power of the terminal device; and not performing joint channel estimation in the first slot with a slot before the first slot.

Embodiment 68: The apparatus according to any one of Embodiments 65 to 67, where the one or more first transmit powers include an endpoint of each of the plurality of transmit power intervals.

Embodiment 69: The apparatus according to any one of Embodiments 65 to 67, where the current transmit power of the terminal device is a second transmit power, and the one or more first transmit powers include two first transmit powers that have a smallest difference from the second transmit power.

Embodiment 70: The apparatus according to any one of Embodiments 65 to 67, where the current transmit power of the terminal device is a second transmit power, and the one or more first transmit powers include one first transmit power that has a smallest difference from the second transmit power.

Embodiment 71: The apparatus according to any one of Embodiments 65 to 67, where the current transmit power of the terminal device is a second transmit power, and the one or more first transmit powers include a first transmit power that is greater than the second transmit power and that has a smallest difference from the second transmit power.

Embodiment 72: The apparatus according to any one of Embodiments 65 to 67, where the current transmit power of the terminal device is a second transmit power, and the one or more first transmit powers include a first transmit power that is less than the second transmit power and that has a smallest difference from the second transmit power.

Embodiment 73: The apparatus according to any one of Embodiments 63 to 72, where the communication apparatus is further configured to perform the following step: sending second indication information to the terminal device, where the second indication information is used to indicate the terminal device to send the first indication information, the first indication information is carried in a MAC CE sent by the terminal device, and the second indication information is carried in any one of the following: an RRC message, a MAC CE, or DCI.

Embodiment 74: The apparatus according to Embodiment 73, where the second indication information is used to indicate the terminal device to periodically report the first indication information.

Alternatively, the second indication information is used to indicate the terminal device to send the first indication information to the network device when an absolute value of a smallest difference between the current transmit power and the endpoint of each of the plurality of transmit power intervals is less than or equal to a first threshold.

Alternatively, the second indication information is used to indicate the terminal device to report the first indication information at a preset time point.

Embodiment 75: The apparatus according to Embodiment 74, where the second indication information is further used to indicate a reporting manner of the first indication information and a quantity of first transmit powers in the first indication information.

Embodiment 76: A communication system, including a terminal device and a network device.

The terminal device is configured to determine first indication information. The first indication information is used to indicate one or more first transmit powers of the terminal device, and the first transmit power is a transmit power corresponding to a phase jump of an uplink signal of the terminal device. The terminal device sends the first indication information to the network device.

The network device is configured to receive the first indication information from the terminal device.

Embodiment 77: The communication system according to Embodiment 76, where the first indication information includes one or more first values, and the one or more first values are in a one-to-one correspondence with the one or more first transmit powers.

The first value is used to represent a difference between a first transmit power corresponding to the first value and a current transmit power.

Embodiment 78: The communication system according to Embodiment 76 or 77, where the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

Embodiment 79: The communication system according to Embodiment 78, where the one or more first transmit powers include an endpoint of each of the plurality of transmit power intervals.

Embodiment 80: The communication system according to Embodiment 78, where the current transmit power of the terminal device is a second transmit power, and the one or more first transmit powers include two first transmit powers that have a smallest difference from the second transmit power.

Embodiment 81: The communication system according to Embodiment 78, where the current transmit power of the terminal device is a second transmit power, and the one or more first transmit powers include one first transmit power that has a smallest difference from the second transmit power.

Embodiment 82: The communication system according to Embodiment 78, where the current transmit power of the terminal device is a second transmit power, and the one or more first transmit powers include a first transmit power that is greater than the second transmit power and that has a smallest difference from the second transmit power.

Embodiment 83: The communication system according to Embodiment 78, where the current transmit power of the terminal device is a second transmit power, and the one or more first transmit powers include a first transmit power that is less than the second transmit power and that has a smallest difference from the second transmit power.

Embodiment 84: The communication system according to any one of Embodiments 79 to 83, where the terminal device is further configured to determine whether an absolute value of a smallest difference between the current transmit power and the endpoint of each of the plurality of transmit power intervals is less than or equal to a first threshold. If the absolute value of the smallest difference between the current transmit power and the endpoint of each of the plurality of transmit power intervals is less than or equal to the first threshold, the terminal device sends the first indication information to the network device.

The network device is further configured to receive the first indication information from the terminal device.

Embodiment 85: The communication system according to any one of Embodiments 76 to 84, where the network device is further configured to send second indication information to the terminal device. The second indication information is used to indicate the terminal device to send the first indication information, and the second indication information is carried in any one of the following: an RRC message, a MAC CE, or DCI.

The terminal device is further configured to: receive the second indication information from the network device, and send the first indication information to the network device in response to the second indication information. The first indication information is carried in a MAC CE sent by the terminal device, and the MAC CE carrying the first indication information is any one of the following: a MAC CE carrying a PHR, a newly added MAC CE, or a MAC CE sent in an uplink slot scheduled by DCI including TPC.

Embodiment 86: The communication system according to Embodiment 85, where the second indication information is used to indicate the terminal device to periodically report the first indication information.

Alternatively, the second indication information is used to indicate the terminal device to send the first indication information to the network device when the absolute value of the smallest difference between the current transmit power and the endpoint of each of the plurality of transmit power intervals is less than or equal to the first threshold.

Alternatively, the second indication information is used to indicate the terminal device to report the first indication information at a preset time point.

Embodiment 87: The communication system according to Embodiment 86, where the second indication information is further used to indicate a reporting manner of the first indication information and a quantity of first transmit powers in the first indication information.

Embodiment 88: The communication system according to any one of Embodiments 76 to 86, where the network device is further configured to: if the network device is performing joint channel estimation, indicate the terminal device to adjust the transmit power of the terminal device in a first power interval. The first power interval is a transmit power interval that is in the plurality of transmit power intervals and that includes the current transmit power of the terminal device.

The terminal device is further configured to adjust the transmit power of the terminal device in the first power interval.

Embodiment 89: The communication system according to any one of Embodiments 76 to 86, where the network device is further configured to: determine a first slot. The transmit power of the terminal device in the first slot is adjusted beyond a first power interval, and the first power interval is a transmit power interval that is in the plurality of transmit power intervals and that includes the current transmit power of the terminal device.

The network device does not perform joint channel estimation in the first slot with a slot before the first slot.

Embodiment 90: The communication system according to any one of Embodiments 76 to 88, where the terminal device is a mobile phone, and the network device is a base station.

Embodiment 91: A computer program product, where when the computer program product runs on a computer, the computer is enabled to perform the method in any one of Embodiment 1 to Embodiment 25.

Embodiment 92: A computer-readable storage medium, where the computer-readable storage medium stores instructions, and when the instructions are run on a computer, the computer is enabled to perform the method in any one of Embodiment 1 to Embodiment 25.

Embodiment 93: A chip, where the chip includes a processor, and when the processor executes instructions, the processor is configured to perform the method in any one of Embodiment 1 to Embodiment 25. The instructions may be from a memory inside the chip, or may be from a memory outside the chip. Optionally, the chip further includes an input/output circuit.

Embodiment 94: A power control method, including:

A terminal device determines a first time window. The first time window is a time period in which a network device performs joint channel estimation.

The terminal device adjusts a transmit power of the terminal device in a first power interval in the first time window. The first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

Embodiment 95: The method according to Embodiment 94, further including:

The terminal device receives third indication information from the network device. The third indication information is used to indicate a maximum quantity L of consecutive slots included in the first time window, a quantity of slots required by the network device to perform one joint channel estimation is greater than 1 and less than or equal to L, and L is a positive integer greater than 1.

The terminal device determines the first time window based on the third indication information.

Embodiment 96: The method according to Embodiment 95, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;

the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

Embodiment 97: The method according to Embodiment 96, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 98: The method according to any one of Embodiments 94 to 96, where the method further includes:

The terminal device adjusts, in a first slot after the first time window, the transmit power of the terminal device based on TPC sent by the network device.

Embodiment 99: The method according to any one of Embodiments 94 to 98, where the terminal device adjusts the transmit power of the terminal device in the first power interval in the first time window includes:

The terminal device determines a first difference. The first difference is an absolute value of a difference between the current transmit power of the terminal device and a third transmit power of the terminal device, and the third transmit power is a transmit power obtained after the network device indicates the terminal device to adjust the transmit power.

When the first difference is less than or equal to a first threshold, the terminal device adjusts the transmit power of the terminal device in the first power interval.

Embodiment 100: The method according to Embodiment 99, where the method further includes:

The terminal device determines the first difference.

When the first difference is greater than the first threshold, the terminal device adjusts the transmit power of the terminal device to the third transmit power.

Embodiment 101: The method according to any one of Embodiments 94 to 100, further including:

The terminal device receives fourth indication information from the network device.

The fourth indication information is used to indicate the network device to enable joint channel estimation.

Embodiment 102: The method according to any one of Embodiments 94 to 101, where the method further includes:

The terminal device determines whether a second difference is less than or equal to a second threshold. The second difference is an absolute value of a difference between the current transmit power of the terminal device and a first transmit power.

If the second difference is less than or equal to the second threshold, the terminal device sends fifth indication information to the network device. The fifth indication information is used to indicate that the second difference is less than the second threshold.

Embodiment 103: A power control method, including:

A network device sends third indication information to a terminal device. The third indication information is used to indicate a maximum quantity L of consecutive slots included in a first time window, the first time window is a time period in which the network device performs joint channel estimation, a quantity of slots required by the network device to perform one joint channel estimation is greater than or equal to 1 and less than or equal to L, and L is a positive integer greater than or equal to 1.

Embodiment 104: The method according to Embodiment 103, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;
  the $(H-1)^{th}$ slot is an unscheduled slot, and the $H^{th}$ slot is a scheduled uplink slot; or
  the network device completes one joint channel estimation in an $(H-L)^{th}$ slot to the $(H-1)^{th}$ slot, and the $H^{th}$ slot is a scheduled uplink slot.

Embodiment 105: The method according to Embodiment 104, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 106: The method according to any one of Embodiments 103 to 105, where the method further includes: The network device sends fourth indication information to the terminal device. The fourth indication information is used to indicate the network device to enable joint channel estimation.

Embodiment 107: The method according to any one of Embodiments 103 to 106, where the method further includes:
  The network device receives fifth indication information from the terminal device. The fifth indication information is used to indicate that a second difference is less than a second threshold, and the second difference is an absolute value of a difference between a current transmit power of the terminal device and a first transmit power.

Embodiment 108: A communication apparatus, including a processing unit.
  The processing unit is configured to determine a first time window. The first time window is a time period in which a network device performs joint channel estimation.
  The processing unit is further configured to adjust a transmit power of a terminal device in a first power interval in the first time window. The first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

Embodiment 109: The apparatus according to Embodiment 108, further including: a communication unit.
  The communication unit is configured to receive third indication information from the network device. The third indication information is used to indicate a maximum quantity L of consecutive slots included in the first time window, a quantity of slots required by the network device to perform one joint channel estimation is greater than or equal to 1 and less than or equal to L, and L is a positive integer greater than or equal to 1.
  The processing unit is further configured to determine the first time window based on the third indication information.

Embodiment 110: The apparatus according to Embodiment 109, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;
  the $(H-1)^{th}$ slot is an unscheduled slot, and the $H^{th}$ slot is a scheduled uplink slot; or
  the network device completes one joint channel estimation in an $(H-L)^{th}$ slot to the $(H-1)^{th}$ slot, and the $H^{th}$ slot is a scheduled uplink slot.

Embodiment 111: The apparatus according to Embodiment 110, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 112: The apparatus according to any one of Embodiments 108 to 111, where the processing unit is further configured to:
  adjust, in a first slot after the first time window, the transmit power of the terminal device based on TPC sent by the network device.

Embodiment 113: The apparatus according to any one of Embodiments 108 to 112, where the processing unit is specifically configured to:
  determine a first difference, where the first difference is an absolute value of a difference between the current transmit power of the terminal device and a third transmit power of the terminal device, and the third transmit power is a transmit power obtained after the network device indicates the terminal device to adjust the transmit power; and when the first difference is less than or equal to a first threshold, adjust the transmit power of the terminal device in the first power interval.

Embodiment 114: The apparatus according to Embodiment 113, where the processing unit is further configured to:
  determine the first difference; and
  when the first difference is greater than the first threshold, adjust the transmit power of the terminal device to the third transmit power.

Embodiment 115: The apparatus according to any one of Embodiments 108 to 114, where the communication unit is further configured to receive fourth indication information from the network device. The fourth indication information is used to indicate the network device to enable joint channel estimation.

Embodiment 116: The apparatus according to any one of Embodiments 108 to 115, where the processing unit is further configured to determine whether a second difference is less than or equal to a second threshold. The second difference is an absolute value of a difference between the current transmit power of the terminal device and a first transmit power.
  The processing unit is further configured to indicate the communication unit to send fifth indication information to the network device. The fifth indication information is used to indicate that the second difference is less than the second threshold.

Embodiment 117: A communication apparatus, including a processing unit and a communication unit.
  The processing unit is configured to indicate the communication unit to send third indication information to a terminal device. The third indication information is used to indicate a maximum quantity L of consecutive slots included in a first time window, the first time window is a time period in which a network device performs joint channel estimation, a quantity of slots required by the network device to perform one joint channel estimation is greater than or equal to 1 and less than or equal to L, and L is a positive integer greater than or equal to 1.

Embodiment 118: The apparatus according to Embodiment 117, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;

the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

Embodiment 119: The apparatus according to Embodiment 118, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 120: The apparatus according to any one of Embodiments 117 to 119, where the communication unit is further configured to send fourth indication information to the terminal device. The fourth indication information is used to indicate the network device to enable joint channel estimation.

Embodiment 121: The apparatus according to any one of Embodiments 117 to 120, where the communication unit is further configured to:

receive fifth indication information from the terminal device, where the fifth indication information is used to indicate that a second difference is less than a second threshold, and the second difference is an absolute value of a difference between a current transmit power of the terminal device and a first transmit power.

Embodiment 122: A communication apparatus, where the communication apparatus may be a terminal device, a chip in a terminal device, or a system-on-a-chip. The communication apparatus includes a processor and a memory, the memory stores instructions, and when the instructions are executed by the processor, the communication apparatus is enabled to perform the following steps: determining a first time window, where the first time window is a time period in which a network device performs joint channel estimation; and adjusting a transmit power of the terminal device in a first power interval in the first time window, where the first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

Embodiment 123: The apparatus according to Embodiment 122, where the communication apparatus is further configured to perform the following steps: receiving third indication information from the network device, where the third indication information is used to indicate a maximum quantity L of consecutive slots included in the first time window, a quantity of slots required by the network device to perform one joint channel estimation is greater than or equal to 1 and less than or equal to L, and L is a positive integer greater than or equal to 1; and determining the first time window based on the third indication information.

Embodiment 124: The apparatus according to Embodiment 123, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;

the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

Embodiment 125: The apparatus according to Embodiment 124, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 126: The apparatus according to any one of Embodiments 122 to 125, where the communication apparatus is further configured to perform the following step: adjusting, in a first slot after the first time window, the transmit power of the terminal device based on TPC sent by the network device.

Embodiment 127: The apparatus according to any one of Embodiments 122 to 126, where the communication apparatus is further configured to perform the following steps: determining a first difference, where the first difference is an absolute value of a difference between the current transmit power of the terminal device and a third transmit power of the terminal device, and the third transmit power is a transmit power obtained after the network device indicates the terminal device to adjust the transmit power; and when the first difference is less than or equal to a first threshold, adjusting the transmit power of the terminal device in the first power interval.

Embodiment 128: The apparatus according to Embodiment 127, where the communication apparatus is further configured to perform the following steps: determining the first difference, and when the first difference is greater than the first threshold, adjusting the transmit power of the terminal device to the third transmit power.

Embodiment 129: The apparatus according to any one of Embodiments 122 to 128, where the communication apparatus is further configured to perform the following step: receiving fourth indication information from the network device. The fourth indication information is used to indicate the network device to enable joint channel estimation.

Embodiment 130: The apparatus according to any one of Embodiments 122 to 129, where the communication apparatus is further configured to perform the following steps: determining whether a second difference is less than or equal to a second threshold, where the second difference is an absolute value of a difference between the current transmit power of the terminal device and a first transmit power; and sending fifth indication information to the network device, where the fifth indication information is used to indicate that the second difference is less than the second threshold.

Embodiment 131: A communication apparatus, where the communication apparatus may be a network device, a chip in a network device, or a system-on-a-chip. The communication apparatus includes a processor and a memory, the memory stores instructions, and when the instructions are executed by the processor, the communication apparatus is enabled to perform the following step: indicating a communication unit to send third indication information to a terminal device. The third indication information is used to indicate a maximum quantity L of consecutive slots included in a first time window. The first time window is a time period in which the network device performs joint channel estimation. A quantity of slots required by the network device to perform one joint channel estimation is greater than or equal to 1 and less than or equal to L, and L is a positive integer greater than or equal to 1.

Embodiment 132: The apparatus according to Embodiment 131, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;

the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

Embodiment 133: The apparatus according to Embodiment 132, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 134: The apparatus according to any one of Embodiments 131 to 133, where the communication apparatus is further configured to perform the following step: sending fourth indication information to the terminal device. The fourth indication information is used to indicate the network device to enable joint channel estimation.

Embodiment 135: The apparatus according to any one of Embodiments 131 to 134, where the communication apparatus is further configured to perform the following step: receiving fifth indication information from the terminal device. The fifth indication information is used to indicate that a second difference is less than a second threshold, and the second difference is an absolute value of a difference between a current transmit power of the terminal device and a first transmit power.

Embodiment 136: A communication system, including a terminal device and a network device.

The terminal device is configured to determine a first time window. The first time window is a time period in which the network device performs joint channel estimation.

The terminal device adjusts a transmit power of the terminal device in a first power interval in the first time window. The first power interval is an interval including a current transmit power of the terminal device in a plurality of transmit power intervals. When the terminal device adjusts the transmit power of the terminal device in any one of the plurality of transmit power intervals, no phase jump occurs in an uplink signal of the terminal device.

Embodiment 137: The communication system according to Embodiment 136, where the network device is configured to send third indication information to the terminal device. The third indication information is used to indicate a maximum quantity L of consecutive slots included in the first time window. The first time window is a time period in which the network device performs joint channel estimation. A quantity of slots required by the network device to perform one joint channel estimation is greater than or equal to 1 and less than or equal to L, and L is a positive integer greater than or equal to 1.

The terminal device is configured to receive the third indication information from the network device. The third indication information is used to indicate the maximum quantity L of consecutive slots included in the first time window, the quantity of slots required by the network device to perform one joint channel estimation is greater than 1 and less than or equal to L, and L is a positive integer greater than 1. The terminal device is further configured to determine the first time window based on the third indication information.

Embodiment 138: The communication system according to Embodiment 136 or 137, where a start time point of the first time window is located in an $H^{th}$ slot, and the $H^{th}$ slot meets any one of the following: an $(H-1)^{th}$ slot is a scheduled downlink slot, and the $H^{th}$ slot is a scheduled uplink slot;

the $(H-1)^{th}$ slot is an unscheduled slot, and the $H^{th}$ slot is a scheduled uplink slot; or the network device completes one joint channel estimation in an $(H-L)^{th}$ slot to the $(H-1)^{th}$ slot, and the $H^{th}$ slot is a scheduled uplink slot.

Embodiment 139: The communication system according to any one of Embodiments 136 to 138, where the first time window includes the $H^{th}$ slot to an $(H+Q)^{th}$ slot, Q is a positive integer greater than or equal to 1 and less than or equal to L, and all the $H^{th}$ slot to the $(H+Q)^{th}$ slot are scheduled uplink slots.

Embodiment 140: The communication system according to any one of Embodiments 136 to 139, where the network device is further configured to send TPC to the terminal device.

The terminal device is further configured to adjust, in a first slot after the first time window, the transmit power of the terminal device based on the TPC sent by the network device.

Embodiment 141: The communication system according to any one of Embodiments 136 to 140, where the terminal device is further configured to: determine a first difference, where the first difference is an absolute value of a difference between the current transmit power of the terminal device and a third transmit power of the terminal device, and the third transmit power is a transmit power obtained after the network device indicates the terminal device to adjust the transmit power; and when the first difference is less than or equal to a first threshold, adjust the transmit power of the terminal device in the first power interval.

Embodiment 142: The communication system according to any one of Embodiments 136 to 141, where the terminal device is further configured to: determine the first difference, and when the first difference is greater than the first threshold, adjust the transmit power of the terminal device to the third transmit power.

Embodiment 143: The communication system according to Embodiment 142, where the terminal device is further configured to: determine the first difference, and when the first difference is greater than the first threshold, adjust the transmit power of the terminal device to the third transmit power.

Embodiment 144: The communication system according to any one of Embodiments 136 to 143, where the network device is further configured to send fourth indication information to the terminal device. The fourth indication information is used to indicate the network device to enable joint channel estimation.

The terminal device is further configured to receive the fourth indication information from the network device. The fourth indication information is used to indicate the network device to enable joint channel estimation.

Embodiment 145: The communication system according to any one of Embodiments 136 to 144, where the terminal device is further configured to determine whether a second difference is less than or equal to a second threshold. The second difference is an absolute value of a difference between the current transmit power of the terminal device and a first transmit power.

If the second difference is less than or equal to the second threshold, the terminal device sends fifth indication information to the network device. The fifth indication information is used to indicate that the second difference is less than the second threshold, and the second difference is the absolute value of the difference between the current transmit power of the terminal device and the first transmit power.

The network device is further configured to receive the fifth indication information from the terminal device.

Embodiment 146: A computer program product, where when the computer program product runs on a computer, the computer is enabled to perform the method in any one of Embodiment 94 to Embodiment 107.

Embodiment 147: A computer-readable storage medium, where the computer-readable storage medium stores instructions, and when the instructions are run on a computer, the computer is enabled to perform the method in any one of Embodiment 94 to Embodiment 107.

Embodiment 148: A chip, where the chip includes a processor, and when the processor executes instructions, the processor is configured to perform the method in any one of Embodiment 94 to Embodiment 107. The instructions may be from a memory inside the chip, or may be from a memory outside the chip. Optionally, the chip further includes an input/output circuit.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power control method, comprising:
    determining, by a terminal device, one or more transmit powers, of the terminal device, corresponding to a phase jump of an uplink signal of the terminal device;
    determining, by the terminal device, first indication information, wherein the first indication information indicates the one or more first transmit powers of the terminal device; and
    sending, by the terminal device, the first indication information to a network device,
    wherein the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

2. The method according to claim 1, wherein the first indication information comprises one or more first values, and the one or more first values are in a one-to-one correspondence with the one or more first transmit powers; and
    the first value represents a difference between a first transmit power corresponding to the first value and a current transmit power.

3. The method according to claim 1, wherein the one or more first transmit powers comprise an endpoint of each of the plurality of transmit power intervals.

4. The method according to claim 3, further comprising:
    determining, by the terminal device, whether an absolute value of a smallest difference between the current transmit power and the endpoint of each of the plurality of transmit power intervals is less than or equal to a first threshold; and
    if the absolute value of the smallest difference between the current transmit power and the endpoint of each of the plurality of transmit power intervals is less than or equal to the first threshold, sending, by the terminal device, the first indication information to the network device.

5. The method according to claim 1, wherein the current transmit power of the terminal device is a second transmit power, and the one or more first transmit powers comprise two first transmit powers that have a smallest difference from the second transmit power.

6. The method according to claim 1, wherein the current transmit power of the terminal device is a second transmit power, and the one or more first transmit powers comprise one first transmit power that has a smallest difference from the second transmit power.

7. The method according to claim 1, wherein the current transmit power of the terminal device is a second transmit power, and the one or more first transmit powers comprise a first transmit power that is greater than the second transmit power and that has a smallest difference from the second transmit power.

8. The method according to claim 1, wherein the current transmit power of the terminal device is a second transmit power, and the one or more first transmit powers comprise a first transmit power that is less than the second transmit power and that has a smallest difference from the second transmit power.

9. A power control method, comprising:
    determining, by a terminal device, one or more transmit powers, of the terminal device, corresponding to a phase jump of an uplink signal of the terminal device;
    determining, by the terminal device, first indication information, wherein the first indication information indicates the one or more first transmit powers of the terminal device; and
    sending, by the terminal device, the first indication information to a network device,
    wherein before the sending, by the terminal device, the first indication information to a network device, the method further comprises:
    receiving, by the terminal device, second indication information from the network device, wherein the second indication information indicates the terminal device to send the first indication information, and the second indication information is carried in any one of the following: a radio resource control (RRC) message, a media access control-control element (MAC CE), or downlink control information (DCI); and sending, by the terminal device, the first indication information to the network device in response to the second indication information, wherein the first indication information is carried in a MAC CE sent by the terminal device, and the MAC CE carrying the first indication information is any one of the following: a MAC CE carrying a power headroom report (PHR), a newly added MAC CE, or a MAC CE sent in an uplink slot scheduled by DCI comprising transmit power control (TPC).

10. The method according to claim 9, wherein the second indication information indicate the terminal device to periodically report the first indication information;

the second indication information indicate; the terminal device to send the first indication information to the network device when the absolute value of the smallest difference between the current transmit power and the endpoint of each of the plurality of transmit power intervals is less than or equal to the first threshold; or the second indication information indicate; the terminal device to report the first indication information at a preset time point.

11. The method according to claim 10, wherein the second indication information further indicates a reporting manner of the first indication information and a quantity of first transmit powers in the first indication information.

12. A communication apparatus, wherein the communication apparatus may be a terminal device, a chip in a terminal device, or a system-on-a-chip, and the communication apparatus comprises a processor and a memory, wherein the memory stores instructions, and when the instructions are executed by the processor, the communication apparatus is enabled to perform the following steps:

determining one or more transmit powers, of the terminal device, corresponding to a phase jump of an uplink signal of the terminal device;

determining first indication information, wherein the first indication information indicates one or more first transmit powers of the terminal device; and sending the first indication information to a network device, wherein the one or more first transmit powers correspond to a plurality of transmit power intervals, the first transmit power is an endpoint of one of the plurality of transmit power intervals, and the phase jump means that a phase of the uplink signal of the terminal device jumps when a transmit power of the terminal device is adjusted between different transmit intervals.

13. The apparatus according to claim 12, wherein the first indication information comprises one or more first values, and the one or more first values are in a one-to-one correspondence with the one or more first transmit powers; and the first value represents a difference between a first transmit power corresponding to the first value and a current transmit power.

14. The apparatus according to claim 12, wherein the one or more first transmit powers comprise an endpoint of each of the plurality of transmit power intervals.

15. The apparatus according to claim 12, wherein the current transmit power of the terminal device is a second transmit power, and the one or more first transmit powers comprise two first transmit powers that have a smallest difference from the second transmit power.

16. The apparatus according to claim 12, wherein the current transmit power of the terminal device is a second transmit power, and the one or more first transmit powers comprise one first transmit power that has a smallest difference from the second transmit power.

17. The apparatus according to claim 12, wherein the current transmit power of the terminal device is a second transmit power, and the one or more first transmit powers comprise a first transmit power that is greater than the second transmit power and that has a smallest difference from the second transmit power.

18. The apparatus according to claim 12, wherein the current transmit power of the terminal device is a second transmit power, and the one or more first transmit powers comprise a first transmit power that is less than the second transmit power and that has a smallest difference from the second transmit power.

* * * * *